(12) United States Patent
Xu et al.

(10) Patent No.: US 11,573,084 B2
(45) Date of Patent: Feb. 7, 2023

(54) METHOD AND SYSTEM FOR HEADING DETERMINATION

(71) Applicant: BEIJING DIDI INFINITY TECHNOLOGY AND DEVELOPMENT CO., LTD., Beijing (CN)

(72) Inventors: Hailiang Xu, Beijing (CN); Renyu Zhao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 536 days.

(21) Appl. No.: 16/792,364

(22) Filed: Feb. 17, 2020

(65) Prior Publication Data

US 2020/0182618 A1    Jun. 11, 2020

Related U.S. Application Data

(63) Continuation of application No. PCT/CN2018/090386, filed on Jun. 8, 2018.

(30) Foreign Application Priority Data

Aug. 17, 2017 (CN) .......................... 201710707761.4

(51) Int. Cl.
*G01C 21/08* (2006.01)
*H04W 4/44* (2018.01)
(Continued)

(52) U.S. Cl.
CPC ......... *G01C 21/08* (2013.01); *G06F 9/30036* (2013.01); *G06K 9/6256* (2013.01); *H04W 4/026* (2013.01); *H04W 4/44* (2018.02)

(58) Field of Classification Search
CPC . G06F 9/30036; G06K 9/6256; H04W 4/026; H04W 4/44; G01S 19/396;
(Continued)

(56) References Cited

U.S. PATENT DOCUMENTS 10,366,502 B1 * 7/2019 Li .............................. B60R 1/00
10,861,257 B1 * 12/2020 Harris .............. G08G 1/096775
(Continued)

FOREIGN PATENT DOCUMENTS

CN      101490634 A       7/2009
CN      105117737 A      12/2015
(Continued)

OTHER PUBLICATIONS

First Office Action in Chinese Application No. 201710707761.4 dated Mar. 2, 2020, 20 pages.
(Continued)

*Primary Examiner* — Mazda Sabouri
(74) *Attorney, Agent, or Firm* — Metis IP LLC

(57) ABSTRACT

A method and system for determining a heading of a vehicle. The method may include receiving, from a mobile computing device, a request for determining the heading of the vehicle. The method may also include retrieving, at least in response to the request, sensor data generated by a magnetometer of the mobile computing device within one or more first time slots, and obtaining a classifier trained to determine a predicted heading of the vehicle. The method may further include, for the sensor data of each of the one or more first time slots, obtaining a feature vector by extracting features from the sensor data, and determining, based on the obtained feature vector, a predicted heading by inputting the feature vector into the classifier. The method may also include determining the heading of the vehicle based on the obtained one or more predicted headings.

20 Claims, 13 Drawing Sheets

(51) Int. Cl.
*G06F 9/30* (2018.01)
*G06K 9/62* (2022.01)
*H04W 4/02* (2018.01)

(58) Field of Classification Search
CPC ......... G01S 19/52; G01S 19/48; G06V 20/56; G06V 40/20; G01C 21/04; G01C 21/08
See application file for complete search history.

(56) References Cited

U.S. PATENT DOCUMENTS

| | | | |
|---|---|---|---|
| 2002/0022924 A1* | 2/2002 | Begin | G01C 21/26 701/408 |
| 2004/0234136 A1 | 11/2004 | Zhu et al. | |
| 2013/0009791 A1 | 1/2013 | Yoshioka et al. | |
| 2014/0176679 A1 | 6/2014 | Lehning | |
| 2015/0142248 A1 | 5/2015 | Han et al. | |
| 2018/0307944 A1* | 10/2018 | Li | G06K 9/6256 |

FOREIGN PATENT DOCUMENTS

| | | |
|---|---|---|
| CN | 105320966 A | 2/2016 |
| CN | 105513155 A | 4/2016 |
| CN | 205354135 U | 6/2016 |
| CN | 106952361 A | 7/2017 |

OTHER PUBLICATIONS

International Search Report in PCT/CN2018/090386 dated Jul. 31, 2018, 5 pages.
Written Opinion in PCT/CN2018/090386 dated Jul. 31, 2018, 4 pages.
Qichangchao, Can the Navigation Accurately Determine the Orientation of the Front of the Vehicle When Starting, 2014, 6 pages.

* cited by examiner

100

```
┌─────────────────────────────────────────────┐
│ Retrieving, in response to a received request for │
│ determining a heading of a target vehicle, first sensor │──101
│ data generated, by a magnetometer of a target user │
│ device, within a first predetermined time period before │
│ the current time │
└─────────────────────────────────────────────┘
                         │
                         ▼
┌─────────────────────────────────────────────┐
│ Dividing the first sensor data into a plurality of test data │──102
│ segments based on a first predetermined time interval │
└─────────────────────────────────────────────┘
                         │
                         ▼
┌─────────────────────────────────────────────┐
│ Obtaining a plurality of first feature vectors │
│ corresponding to the plurality of first feature vectors by │──103
│ extracting features from the plurality of test data │
│ segments │
└─────────────────────────────────────────────┘
                         │
                         ▼
┌─────────────────────────────────────────────┐
│ Generating a plurality of predicted headings by inputting │──104
│ the plurality of first feature vectors into a classifier │
└─────────────────────────────────────────────┘
                         │
                         ▼
┌─────────────────────────────────────────────┐
│ Determining a result heading of the target vehicle based │──105
│ on the plurality of predicted headings │
└─────────────────────────────────────────────┘
```

501 Determining, based on the total value ranges of the sampled magnetic flux densities along the three axes, $M - 2$ predetermined value ranges

502 Obtaining a set of distribution statistics by determining, for each of the axes, a distribution of the sampled magnetic flux densities among the predetermined value ranges

FIG. 5

METHOD AND SYSTEM FOR HEADING DETERMINATION

CROSS REFERENCE

This application is a Continuation of International Application No. PCT/CN2018/090386, filed on Jun. 8, 2018, which claims priority of Chinese Application No. 201710707761.4 filed on Aug. 17, 2017, the entire contents of which are hereby incorporated by reference.

TECHNICAL FIELD

The present disclosure generally relates to a method and system for determining a heading of a vehicle, and particularly relates to a method and system for determining a heading of a vehicle based on data from one or more magnetometers.

BACKGROUND

The determination of the heading of a vehicle during driving is very important for providing a transportation service, and may directly affect the route determination from a driver's location to the pick-up or drop-off location of a passenger. An incorrectly-determined heading may lead to a suboptimal route, which may cause a detour situation, a waste of time for both the driver and the passenger, and/or a reduction of the travel efficiency.

In the prior art, the heading of the vehicle is usually determined according to a "bearing" field in the current Global Positioning System (GPS) information of the vehicle. However, the heading may be accurately determined based on the bearing field only when the GPS signal is good and the vehicle is moving fast. When the vehicle is moving at a slow speed or at rest, or when the vehicle is in a poor GPS signal environment, a determination based on the bearing field may not provide valid heading information.

SUMMARY

According to an aspect of the present disclosure, a method for determining a heading of a vehicle is provided. The method may include receiving a request for determining the heading of the vehicle from the mobile computing device, retrieving, at least in response to the request, sensor data generated by a magnetometer of the mobile computing device within one or more first time slots, and obtaining a classifier trained to determine a predicted heading of the vehicle. The method may also include, for the sensor data of each of the one or more first time slots, obtaining a feature vector by extracting features from the sensor data, and determining, based on the obtained feature vector, a predicted heading by inputting the feature vector into the classifier. The method may further include determine the heading of the vehicle based on the obtained one or more predicted headings.

In some embodiments, the sensor data of each of the one or more first slots may be associated with a weight. The determining the heading of the vehicle based on the obtained one or more predicted headings may include: determining, for each unique heading of the one or more predicted headings, a sum of the weights of the each unique heading; and determining the heading of the vehicle based on a ranking of the sums of the weights of the predicted headings.

In some embodiments, the retrieving sensor data generated by a magnetometer may include: retrieving, in response to the request, first positioning data determined by the mobile computing device within a second time slot; determining a first displacement value of the vehicle over the second time slot based on the first positioning data; determining whether the first displacement value is less than a first threshold; upon determining that the first displacement value is less than the first threshold, retrieving the sensor data for determining the heading of the vehicle; and upon determining that the first displacement value is more than or equal to the first threshold, determining the heading of the vehicle based on the first positioning data.

In some embodiments, the obtaining a feature vector by extracting the features from the sensor data may include: determining, based on the sensor data, a plurality of magnetic flux densities along three axes of a Cartesian coordinate system with respect to the mobile computing device. The obtaining a feature vector may also include, for each of the three axes, determining a mean and a variance of the magnetic flux densities along the axis, and generating a histogram measuring a distribution of values of the magnetic flux densities along the axis. The obtaining a feature vector may further include generating the feature vector based on the means, the variances, and the histograms of the three axes.

In some embodiments, the method may further include training the classifier train the classifier. The training the classifier may include generating a training dataset, and training the classifier using a training routine and the training dataset. The generating a training dataset may include retrieving sensor data generated by the magnetometer of the mobile computing device within a plurality of third time slots. The generating a training dataset may also include, for each of the plurality of third time slots, obtaining a feature vector by extracting the features from the sensor data of the third time slot, determining a standard heading of the vehicle corresponding to the third time slot, and designating the standard heading of the vehicle corresponding to the third time slot as a supervisory output of the feature vector. The generating a training dataset may further include generating the training dataset using the feature vectors and the corresponding supervisory outputs of the plurality of third time slots.

In some embodiments, the training routine may be based on a random forest algorithm.

In some embodiments, the method may further include updating the classifier. The updating the classifier may include: selecting a first plurality of decision trees from the classifier; obtaining an updated training dataset by updating the training dataset; training a second plurality of decision trees using the updated training dataset; and generating an updated classifier with the first plurality of decision trees and the second plurality of decision trees.

In some embodiments, the determining a standard heading of the vehicle corresponding to the third slot may include: retrieving, in response to the request, second positioning data determined by the positioning module of the mobile computing device within the third time slot; determining a second displacement value of the vehicle over the third time slot based on the second positioning data; determining whether the second displacement value is more than a second threshold; and upon determining that the second displacement value is more than the second threshold, determining the standard heading of the vehicle corresponding to the third time slot based on the second positioning data.

In some embodiments, the determining the standard heading of the vehicle corresponding to the third time slot based on the second positioning data may include determining a preliminary standard heading based on the second positioning data; determining a plurality of heading classes; classifying the preliminary standard heading into one of the plurality of heading classes; and designating a heading corresponding to the heading class of the preliminary standard heading as the standard heading of the vehicle corresponding to the third time slot.

In some embodiments, the determining a standard heading of the vehicle corresponding to the third slot may include excluding, upon determining that the second displacement value is less than or equal to the second threshold, the sensor data of the corresponding third time slot from being used to generate the training dataset.

In some embodiments, the method may further include detecting an application executing on the mobile computing device, the application automatically communicating with the network system; determining, based on data determined by the application executing to interface with a positioning module of the mobile computing device, a current location of the mobile computing device; providing data to the application to generate a presentation on a display of the mobile computing device, the presentation including a map; communicating with the application to receive the request; providing data to the application to cause the presentation to depict (i) the current location of the mobile computing device and (ii) the heading of the vehicle.

According to another aspect of the present disclosure, a system for determining a heading of a vehicle is provided. According to an aspect of the present disclosure, a system for determining a heading of a vehicle is provided. The system may include at least one network interface and at least one processor coupled to the at least one network interface. The at least one network interface may be configured to communicate, via a network system, with a mobile computing device associated with the vehicle. The at least one processor may be configured to receive a request for determining the heading of the vehicle from the mobile computing device and retrieve, at least in response to the request, sensor data generated by a magnetometer of the mobile computing device within one or more first time slots. The at least one processor may also be configured to obtain a classifier trained to determine a predicted heading of the vehicle. For the sensor data of each of the one or more first time slots, the at least one processor may be configured to obtain a feature vector by extracting features from the sensor data and determine, based on the obtained feature vector, a predicted heading by inputting the feature vector into the classifier. The at least one processor may be configured further to determine the heading of the vehicle based on the obtained one or more predicted headings.

According yet to another aspect of the present disclosure, another system for determining a heading of a vehicle is provided. The system may include a test data retrieving module, a test data dividing module, a test feature vector determination module, a heading data retrieving module, and a heading determination module. The test data retrieving module may be configured to retrieve, in response to a received request for determining a heading of a vehicle, first sensor data generated, by a magnetometer of a target user device, within a first predetermined time period before the current time. The target user device may be associated with the vehicle. The test data dividing module may be configured to divide the first sensor data into a plurality of test data segments based on a first predetermined time interval. The test feature vector determination module may be configured to obtain a plurality of first feature vectors corresponding to the plurality of first feature vectors by extracting features from the plurality of test data segments. The heading data retrieving module may be configured to generate a plurality of predicted headings by inputting the plurality of first feature vectors into a classifier. The determination module may be configured to determine a result heading of the vehicle based on the plurality of predicted headings.

In some embodiments, the system may further include a training data retrieving module, a sample data dividing module, a sample label determination module, a sample feature vector determination module, and a classifier training module. The training data retrieving module may be configured to retrieve second sensor data generated, by a magnetometer of a target user device, within a second predetermined time period. The sample data dividing module may be configured to divide the second sensor data into a plurality of sample data segments based on a predetermined time interval. The second sensor data may include a plurality of magnetic flux densities along three axes of a Cartesian coordinate system with respect to the mobile computing device. The sample label determination module may be configured to: determine, for each of the plurality of sample data segments, a standard heading of the vehicle corresponding to the sample data segment; and designate the standard heading as a label of the sample data segment. The sample feature vector determination module may be configured to: determine, for each of the plurality of sample data segments, a plurality of statistical values with respect to magnetic flux densities along each of the three axes; and obtain a second feature vector for each of the plurality of sample data segments based on the plurality of statistical values. The classifier training module may be configured to obtain a classifier for determining a heading of the vehicle by performing, based on the labels and the plurality of second feature vectors corresponding to the plurality of sample data segments, a predetermined training routine of the classifier.

In some embodiments, the sample feature vector determination module may include a value range determination unit and a distribution determination unit. The value range determination unit may be configured to determine, based on total value ranges of the magnetic flux densities along the three axes, a plurality of predetermined value ranges. The distribution determination unit may be configured to obtain a set of distribution statistics by determining, for each of the three axes, a distribution of the magnetic flux densities among the predetermined value ranges. The set of distribution statistics may be included in the plurality of statistical values.

In some embodiments, the sample label determination module may include a data retrieving unit, a first comparison unit, and a heading determination unit. The data retrieving unit may be configured to retrieve positioning data of the vehicle corresponding to each of the plurality of sample data segments. The first comparison unit may be configured to determine, for the each of the plurality of sample data segments, based on the positioning data, whether a corresponding displacement value of the vehicle is above a predetermined threshold. The displacement value may be a displacement value of the vehicle over a predetermined time interval corresponding to the sample data segment. The heading determination unit may be configured to designate, upon determining that the displacement value is above the threshold, a heading of the target vehicle at the end time point of a time slot corresponding to the each of the plurality of sample data segments as the heading corresponding to the each of the plurality of sample data segments.

According yet to another aspect of the present disclosure, a non-transitory computer readable medium storing instructions is provided. The instructions, when executed by a processor, may cause the processor to execute operations. The operations may include receiving a request for determining the heading of the vehicle from the mobile computing device, retrieving, at least in response to the request, sensor data generated by a magnetometer of the mobile computing device within one or more first time slots, and obtaining a classifier trained to determine a predicted heading of the vehicle. The operations may also include, for the sensor data of each of the one or more first time slots, obtaining a feature vector by extracting features from the sensor data, and determining, based on the obtained feature vector, a predicted heading by inputting the feature vector into the classifier. The operations may further include determining the heading of the vehicle based on the obtained one or more predicted headings Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a schematic diagram illustrating an exemplary process of heading determination according to some embodiments of the present disclosure;

FIG. 5 is a schematic diagram illustrating an exemplary process for determining a set of distribution statistics of sampled magnetic flux densities along each of the three axes with respect to N predetermined value ranges according to some embodiments of the present disclosure;

DETAILED DESCRIPTION

Figure 2:
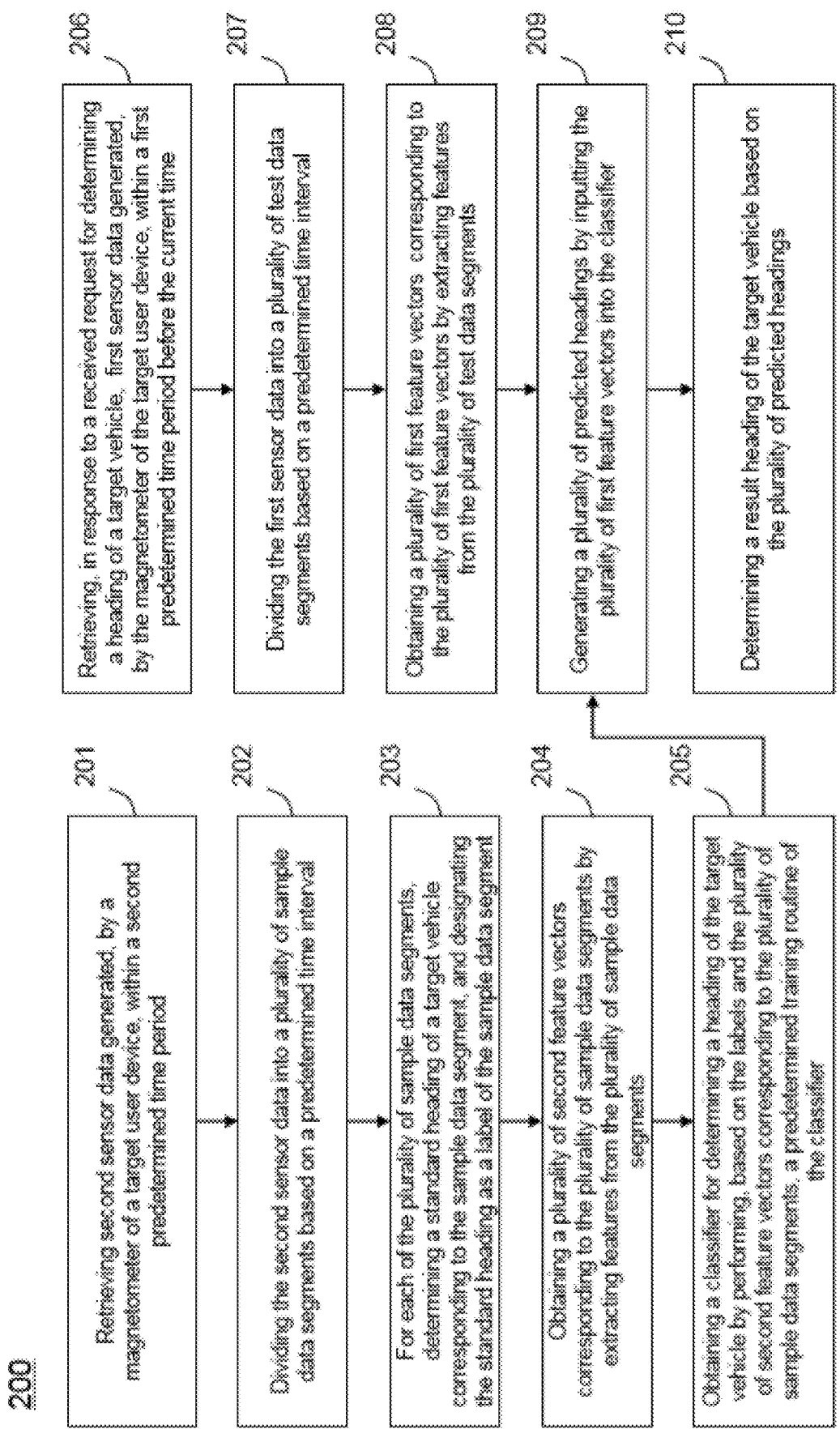
FIG. 2 is a schematic diagram illustrating an exemplary process of heading determination according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding online-to-offline transportation service, it should also be understood that this is only one exemplary embodiment. The system or method of the present disclosure may be applied to any other kind of online-to-offline service. For example, the system or method of the present disclosure may be applied to different transportation systems including land, ocean, aerospace, or the like, or any combination thereof. The vehicle of the transportation systems may include a taxi, a private car, a hitch, a bus, a vessel, an aircraft, a driverless vehicle, a bicycle, a tricycle, a motorcycle, or the like, or any combination thereof. The transportation system may also include any transportation system that applies management and/or distribution, for example, a system for transmitting and/or receiving an express, or a system for a take-out service. The application scenarios of the system or method of the present disclosure may include a web page, a plug-in of a browser, a client terminal, a custom system, an internal analysis system, an artificial intelligence robot, or the like, or any combination thereof.

The terms "passenger," "requester," "service requester," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure relates to systems and methods for displaying information relating to an online-to-offline service (e.g., a taxi service). In order to help a passenger who initiates a service request of the taxi service to identify a vehicle of a driver who accepts the service request easily and quickly, an online-to-offline service platform may generate an image showing a type of the vehicle of the driver, a color of the vehicle of the driver, a plate number of the vehicle of the driver, and/or a mark on a surface of the vehicle of the driver, and showing the vehicle of the driver from a perspective of the passenger. Alternatively or additionally, the online-to-offline service platform may generate a map showing a real-time position of the vehicle of the driver and real-time positions of other vehicles surrounding the vehicle of the driver. In order to help the passenger to monitor the process of the online-to-offline service without unlocking the passenger's smart phone when the passenger's smart phone is locked, the online online-to-offline service platform may determine information corresponding to the process of the on-demand service, and send the information corresponding to the process of the on-demand service along with a display instruction to the passenger's smart phone. The display instruction may prompt the passenger's smart phone to display the information corresponding to the process of the online-to-offline service on a lock screen interface of the passenger's smart phone when the passenger's smart phone is locked.

It should be noted that online-to-offline service transportation service, such as online taxi service, is a new form of service rooted only in post-Internet era. It provides technical solutions to users and service providers that could raise only in post-Internet era. In the pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi service, however, obtains transaction requests in real-time and automatically. The online taxi service also allows a user of the service to real-time and automatic distribute a service request to a vast number of individual service providers (e.g., taxi) distance away from the user and allows a plurality of service providers to respond to the service request simultaneously and in real-time. Therefore, through Internet, the online-to-offline transportation systems may provide a much more efficient transaction platform for the users and the service providers that may never met in a traditional pre-Internet transportation service system.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 3:
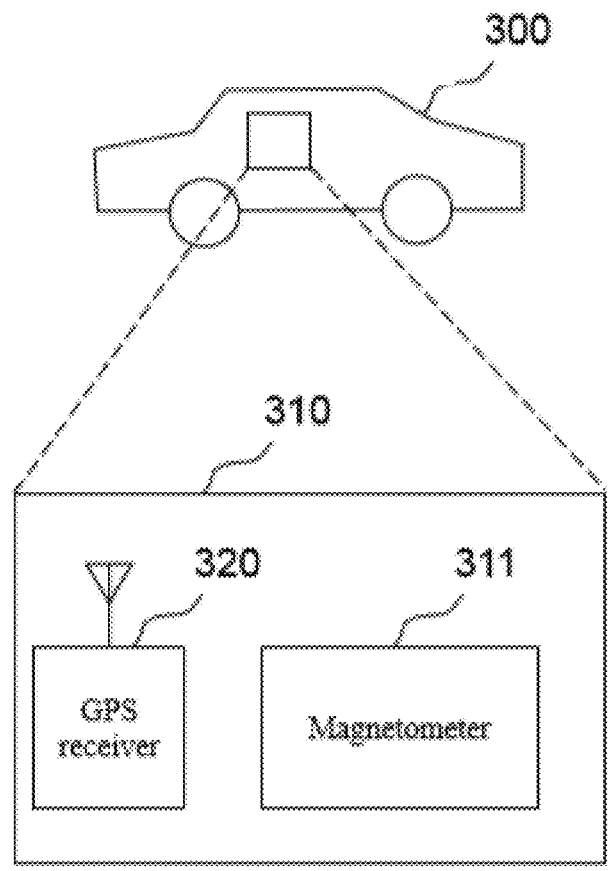
FIG. 3 is a schematic diagram illustrating an exemplary application scenario of a heading classifier training routine according to some embodiments of the present disclosure.

Software modules/units/blocks configured for execution on computing devices (e.g., processor 310 as illustrated in FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

Figure 14:
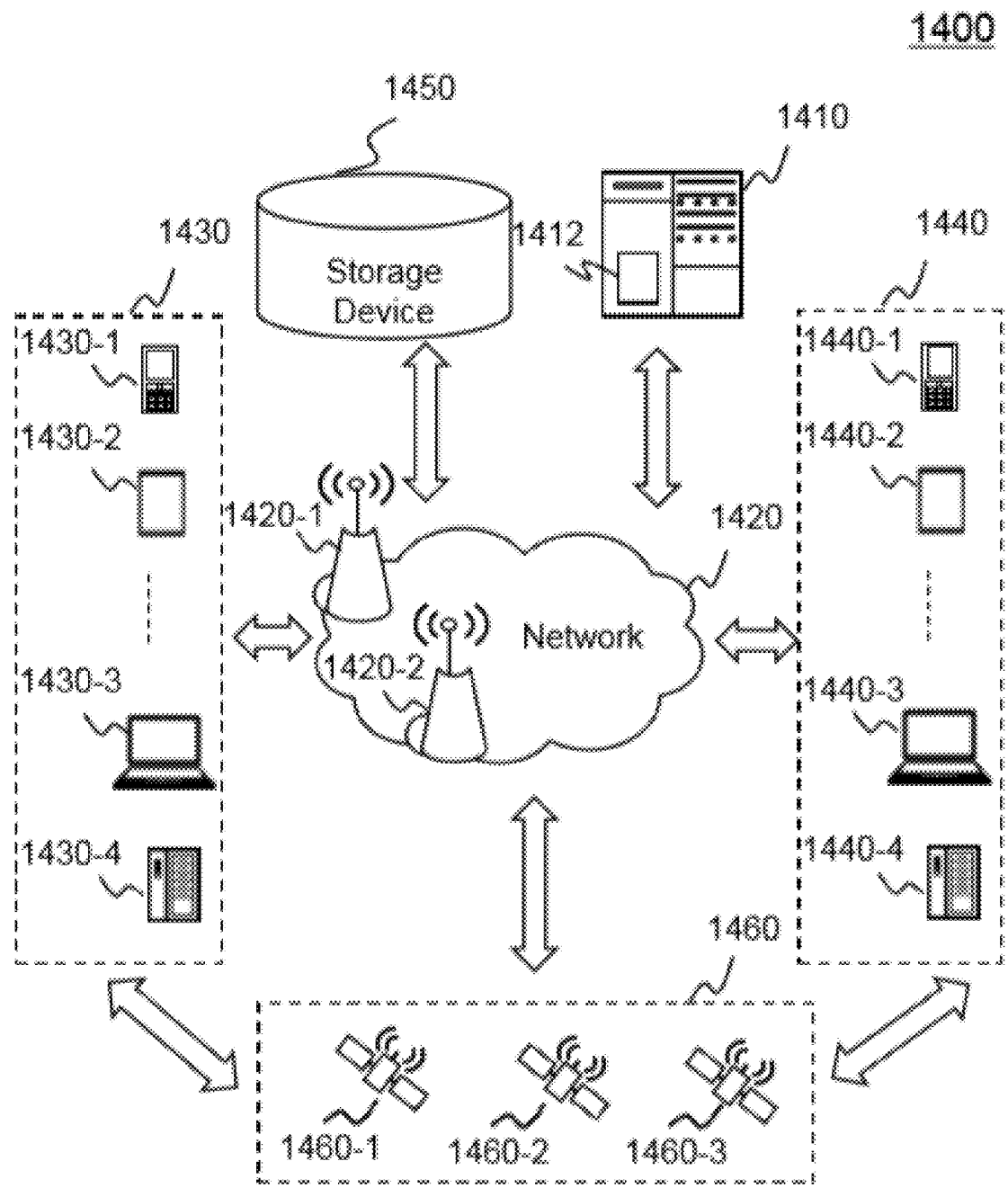
FIG. 14 is a schematic diagram illustrating an exemplary online-to-offline service system according to some embodiments of the present disclosure.

During a driving, when a driver is to pick up a passenger for providing an online-to-offline transportation service (e.g., via an online-to-offline service system 1400 illustrated in FIG. 14), the driver usually fixes his/her mobile phone (e.g., provider terminal 1440 as illustrated in FIG. 14) at a certain position in his/her vehicle, and does not move the phone for a long time. Thus, the sensor data generated by a magnetometer of the mobile phone may correlate with a direction of the fixed mobile phone, and is insensitive to whether the vehicle is moving or the speed of the vehicle. When the vehicle moves towards to different directions, the sensor data of the magnetometer may be different correspondingly. Therefore, in some embodiments, the sensor data of the magnetometer may be considered as an important basis for determining the heading of the vehicle. However, as the magnetometer is prone to be affected by the metal material of the vehicle, the heading of the vehicle may not be determined directly and accurately by the magnetometer itself. In the present disclosure, by introducing a machine learning algorithm, an accurate determination of the heading may be achieved even when a displacement value of a vehicle is relatively small.

Figure 10:
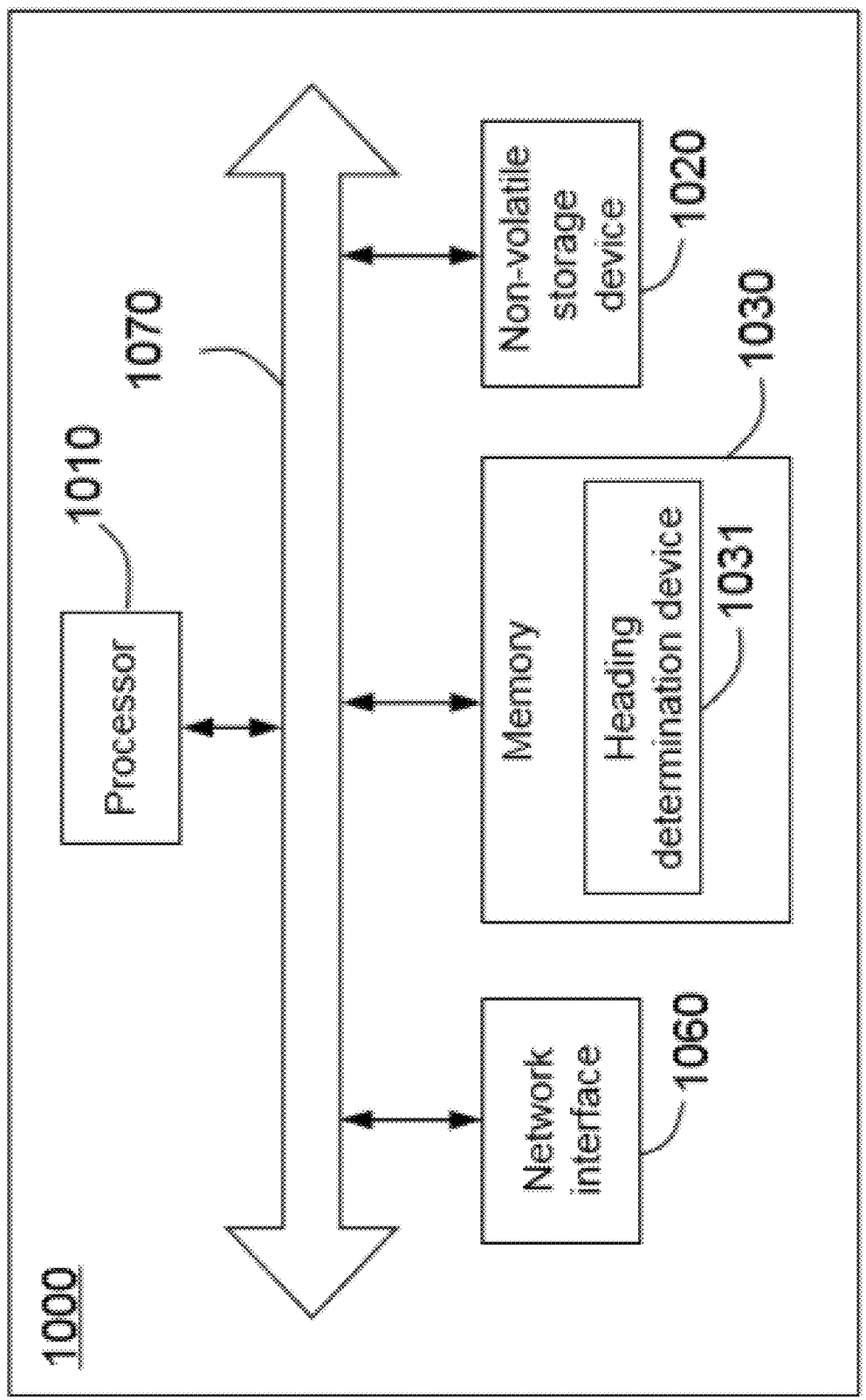
FIG. 10 is a schematic diagram illustrating an exemplary computing device.

FIG. 1 is a schematic diagram illustrating an exemplary process of a heading determination according to some embodiments of the present disclosure. Process 100 may be implemented by a server (e.g., server 1410 as illustrated in FIG. 14) or a terminal (e.g., provider terminal 1440 as illustrated in FIG. 14). In some embodiments, one or more operations of process 100 illustrated in FIG. 1 may be implemented in the online-to-offline system 1400 illustrated in FIG. 14. For example, the process 100 illustrated in FIG. 1 may be stored in a storage device (e.g., memory 1030, non-volatile storage device 1020, storage device 1450) in the form of instructions, and invoked and/or executed by at least one processor (e.g., processor 1010 of the computing device 1000 as illustrated in FIG. 10). As shown in FIG. 1, process 100 may include operations 101-105.

In 101, the at least one processor may retrieve, in response to a received request for determining a heading of a target vehicle (e.g., target vehicle 300 illustrated in FIG. 3), first sensor data generated within a first predetermined time period before the current time. The first sensor data may be generated by a magnetometer (e.g., magnetometer 311 illustrated in FIG. 3) of a target user device (e.g., target user device 310 illustrated in FIG. 3). In the present disclosure, the term "first sensor data" may refer to data generated by the magnetometer for determining a heading of the target vehicle.

In some embodiments, the target user device may be associated with the target vehicle (for example, the target user device may be fixed at a certain position of the target vehicle, or the target user device may be stationary with respect to the target vehicle).

In some embodiments, the at least one processor may receive the request from the target user device (e.g., the provider terminal 1440 illustrated in FIG. 14), or a mobile computing device of a passenger after the passenger is picked up by the target vehicle (e.g., the requester terminal 1430 illustrated in FIG. 14).

Figure 4:
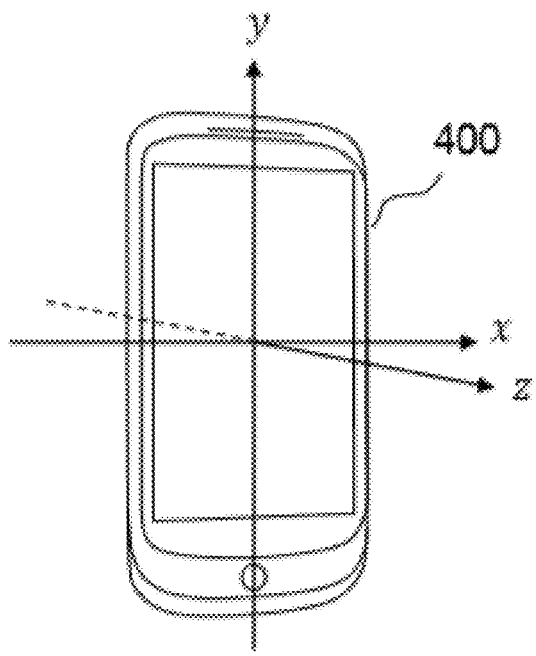
FIG. 4 is a schematic diagram illustrating exemplary directions of three axes with respect to an exemplary target user device according to some embodiments of the present disclosure.

In some embodiments, after receiving the request for determining the heading of the target vehicle, the at least one processor may retrieve the first sensor data generated by the magnetometer of the target user device within the first predetermined time period (for example, two seconds) before the current time point. The first sensor data may include datums (or be referred to as sensor datums) representing sampled magnetic flux densities along x, y, and z axes (e.g., as illustrated in FIG. 4) of the target user device in units of Tesla (symbol T). For example, a sensor datum may be a 3-dimensional vector. In some embodiments, each element of the 3-dimensional vector may be a determined or sampled magnetic flux density along a corresponding axis.

In some embodiments, the at least one processor may retrieve the first sensor data of the target user device based on a predetermined sampling frequency (for example, 10 Hz).

In 102, the at least one processor may divide the first sensor data into a plurality of test data segments based on a predetermined time interval.

In some embodiments, the retrieved first sensor data may be divided into a plurality of test data segments based on the predetermined time interval (e.g., 200 ms), so as to obtain sensor datums corresponding to each of the plurality of test data segments.

The first predetermined time may include a plurality of first time slots. Each of the plurality of test data segments may be sensor data (or sensor datums) generated by the magnetometer of the target user device within a corresponding first time slot. The sensor datums corresponding to each of the plurality of test data segments (or the sensor data corresponding to each of the first time slots) may include magnetic flux densities along each of the x, y, and z axes sampled (or determined), by the magnetometer, during the corresponding first time slot.

In 103, the at least one processor may obtain a plurality of first feature vectors corresponding to the plurality of first feature vectors by extracting features from the plurality of test data segments. The term "first feature vector" may refer to a feature vector for determining a predicted heading of the target vehicle.

In some embodiments, for each of the plurality of test data segments, the at least one processor may determine M statistical values with respect to sampled magnetic flux densities along each of the three axes, so as to obtain a 3*M-dimensional feature vector (first feature vector) for each test data segment.

In some embodiments, for each of the plurality of test data segments, the at least one processor may determine the M statistical values for each of the x, y, and z axes.

In some embodiments, for each of the plurality of test data segments, the at least one processor may determine a mean, a variance, and a set of distribution statistics with respect to N predetermined value ranges for the corresponding sampled magnetic flux densities along each of the x, y, and z axes, respectively.

For example, for each of the plurality of test data segments, by determining a mean, a variance, and a set of distribution statistics with respect to N predetermined value ranges of the corresponding sampled magnetic flux densities along the x axis, the at least one processor may obtain an M-dimension feature vector associated with the x axis. Similarly, for the each of the plurality of test data segments, an M-dimensional magnetic data feature vector associated with the y axis and an M-dimensional magnetic data feature vector associated with the z axis may also be obtained accordingly. Thus, for each of the plurality of test data segments, a 3*M-dimensional magnetic data feature vectors may be obtained overall.

In 104, the at least one processor may generate a plurality of predicted headings by inputting the plurality of first feature vectors into a classifier (or be referred to as a heading classifier).

In some embodiments, the classifier may be pre-trained to determine the heading of the target vehicle based on sensor data (e.g., the first sensor data) generated by the magnetometer of the target user device.

In some embodiments, as one predicted heading may be obtained when one first feature vector is inputted into the classifier, multiple predicted headings may be obtained by inputting the plurality of first feature vectors into the classifier.

In 105, the at least one processor may determine a result heading of the target vehicle based on the plurality of predicted headings.

In some embodiments, the operation 105 may include operations (a-i) and (a-ii). A process including operations (a-i) and (a-ii) or similar operations may be referred to as a weighted voting.

In operation (a-i): the at least one processor may determine, for each unique heading of the plurality of predicted headings, a sum of weights based on a number of predetermined weights, each respectively corresponding to each of the plurality of test data segments; and In operation (a-ii), the at least one processor may determine the result heading of the target vehicle based on the sum of weights of the each unique heading of the plurality of predicted headings.

For example, if the obtained plurality of predicted headings are [20, 40, 20, 60, 90, 20, 40, 40, 0, 20], and the corresponding predetermined weights are [0.1, 0.2, 0.3, 0.4, 0.5, 0.6, 0.7, 0.8, 0.9, 1.0], the sum of weights of the heading 20 is 0.1+0.3+0.6+1.0=2.0; the sum of weights of the heading 40 is 0.2+0.7+0.8=1.7; the sum of weights of the heading 60 is 0.4; the sum of weights of the heading 90 is 0.5; and the sum of weights of the heading 0 is 0.9. Therefore, the result heading may be determined as the heading 20 of which the sum of weights is the highest.

It may be understood that, in some embodiments, due to errors on sensor data, the result of a single determination may not be accurate or precise. Therefore, the at least one processor may determine a plurality of predicted headings by repeating the heading determination, and then determine the result heading of the target vehicle based on the plurality of predicted headings, so that the accuracy or preciseness of the heading determination may be improved.

In some embodiments, during the operation 101, in response to the received request for determining the heading of a target vehicle, the at least one processor may perform operations (b-i) and (b-ii) to retrieve the first sensor data generated by the magnetometer of the target user device within the first predetermined time period before the current time point:

In operation (b-i), the at least one processor may determine, in response to receiving the request for determining the heading of the target vehicle, whether a current displacement value (first displacement value) of the vehicle is less than a predetermined first threshold.

In some embodiments, the current displacement value is a displacement value of the vehicle over a predetermined time interval (or a second time slot) before the current time point.

In some embodiments, when the GPS signal is poor or cannot be received, the at least one processor may set the current displacement value of the target vehicle at zero.

In some embodiments, to determine the first displacement value, the at least one processor may retrieve, in response to the request, first positioning data determined by the target user device within the second time slot. In some embodiments, the first positioning data may be determined by a positioning module (e.g., GPS receiver 320 illustrated in FIG. 3) of the target user device.

Operation (b-ii): the at least one processor may retrieve, in response to determining that the current displacement value is less than the first threshold, the first sensor data generated by the magnetometer of the target user device within the first predetermined time period before the current time point.

In some embodiments, in response to determining that the current displacement value is greater than the first threshold, the at least one processor may determine the heading of the target vehicle by subtracting the current GPS location (or location determined based on GPS signal) from a prior GPS location (e.g., a few seconds before) of the target vehicle.

As can be seen from the above description, in the present disclosure, via a process including retrieving the first sensor data by the magnetometer of the target user device within the first predetermined time period before the current time point, extracting a feature vector (first feature vector) from each of the plurality of data segments of the first sensor data, and inputting the plurality of first feature vectors of the plurality of data segments into the heading classifier, the heading of the target vehicle may be determined based on the sensor data generated by the magnetometer with enhanced accuracy. In some embodiments, such an approach may save time for the driver and of the transportation service, and the travel efficiency of the passenger may be improved.

It may be noted that the above descriptions of the process of the heading determination are only for demonstration purposes and not intended to be limiting. It will be apparent for those skilled in the art that after understanding the basic principle of the image generation process, without deviating from the principle, various modifications and changes in form and detail may be made in the implementations and operations of the heading determination procedure, simple derivations or changes may also be made without any creative efforts, the order of individual operations may be adjusted, or individual operations may be combined, and such modifications and changes are still within the scope of the above description.

For example, the at least one processor may directly retrieve sensor data generated within a first time slot to form a corresponding test data segment, instead of retrieving the first sensor data as a whole and then dividing it.

As another example, although generating a plurality of predicted headings and then determining the heading of the target vehicle based on the plurality of predicted headings may improve the accuracy of the heading determination, generating only one predicted heading as the result heading of the vehicle is also applicable. The at least one processor may retrieve sensor data generated within one first time slot before the current time point, and then input the feature vector extracted therefrom into the classifier to determine the heading of the target vehicle.

When multiple test data segments are used for determining a heading of the target vehicle, the corresponding first time slots may form a continuous time slot or may be at least partially separated. The first time slots may be partially overlapped or not.

FIG. 2 is a schematic diagram illustrating an exemplary process of heading determination according to some embodiments of the present disclosure. In some embodiments, process 200 is an example of process 100 illustrated in FIG. 1. In process 200, the operations 206-210 may be the same as or similar to the operations 101-105 of process 100, the descriptions of which are not repeated herein. As shown in FIG. 2, process 200 may further include operations 201-205 to pre-train the classifier.

In some embodiments, one or more operations of process 200 illustrated in FIG. 2 may be implemented in the online-to-offline system 1400 illustrated in FIG. 14. For example, the process 200 illustrated in FIG. 2 may be stored in a storage device (e.g., memory 1030, non-volatile storage device 1020, storage device 1450) in the form of instructions, and invoked and/or executed by at least one processor (e.g., processor 1010 of the computing device 1000 as illustrated in FIG. 10).

In 201, the at least one processor may retrieve second sensor data generated by a magnetometer of a target user device, within a second predetermined time period. In the present disclosure, the term "second sensor data" may refer to data generated by the magnetometer for training the aforementioned heading classifier.

Referring to FIG. 3. FIG. 3 is a schematic diagram illustrating an exemplary application scenario of a heading classifier training routine according to some embodiments of the present disclosure. As shown in FIG. 3, the at least one processor may retrieve the second sensor data of the target user device generated by a magnetometer 310 (e.g., implemented by a Micro-Electro-Mechanical System (MEMS)) of a target user device 310 (e.g., the provider terminal 1440 illustrated in FIG. 14) within the second predetermined time period (e.g., half an hour). The second sensor data may include sensor datums representing magnetic flux densities along each of the x, y, and z axes (e.g., as illustrated in FIG. 4) with respect to the target user device in units of Tesla.

Refer to FIG. 4. FIG. 4 is a schematic diagram illustrating exemplary directions of three axes with respect to an exemplary target user device according to some embodiments of the present disclosure. The target user device (e.g., the target user device 310 illustrated in FIG. 3) may be or include a mobile phone 400 of a user (e.g., a driver) associated with a target vehicle (e.g., vehicle 300 illustrated in FIG. 3). The x, y, and z axes may belong to a Cartesian coordinate system with respect to the mobile phone 400. The Cartesian coordinate system may be, for example, defined in relation to the screen of the mobile phone 400 when the mobile phone 400 is held in its default orientation. In this orientation, with respect to a user of the mobile phone 400, the x axis may be horizontal and point to the right, the y axis may be vertical and point up, and the z axis may point outward from the screen facade. The original point of the Cartesian coordinate system may be set at the center of the mobile phone 400, at the center of the screen, or at a reference point of the magnetometer for sampling or determining the magnetic flux densities.

In some embodiments, the second sensor data (as well as the first sensor data) may include sensor datums representing intensities (e.g., in the unit of A, mA, V, mV) of signals generated by the magnetometer 310 caused by the magnetic flux densities along each of the x, y, and z axes instead of the corresponding magnetic flux densities. For convenience and simplicity, such a signal intensity may also be referred to as a sampled magnetic flux density.

Refer back to FIG. 2. In some embodiments, the second sensor data of the target user device 310 may be retrieved based on a predetermined sampling frequency (e.g., 10 Hz).

In 202, the at least one processor may divide the second sensor data into a plurality of sample data segments based on a predetermined time interval.

In some embodiments, the at least one processor may divided the retrieved second sensor data into a plurality of sample data segments based on the predetermined time interval (e.g., 3 seconds), and obtain sensor datums of each of the plurality of sample data segments.

The second predetermined time may include a plurality of third time slots. Each of the plurality of sample data segment may be or include sensor data (or sensor datums) generated by the magnetometer of the target user device within a corresponding third time slot.

In some embodiments, the at least one processor may also directly retrieve sensor data generated within a third time slot to form a corresponding sample data segment, instead of retrieving the second sensor data as a whole and then dividing it. Multiple sample data segments may be used for training a heading classifier. The corresponding third time slots may form a continuous time slot or may be entirely or partially separated. The third time slots may be partially overlapped or not.

In 203, the at least one processor may determine, for each of the plurality of sample data segments, a standard heading of a target vehicle corresponding to the sample data segment, and designate the standard heading as a label of the sample data segment. The term "label" may refer to a supervisory output of a corresponding sample data segment for training the heading classifier.

In some embodiments, the standard heading of the target vehicle corresponding to each of the sample data segments may be determined via a predetermined approach (including but not limited to a manual tagging approach, or the like). To be more specific, the standard heading corresponding to each of the sample data segments is an actual heading of the target vehicle over a time interval (third time slot) corresponding to the sample data segment.

The target user device may associate with the target vehicle. Referring to FIG. 3. As shown in FIG. 3, the target user device 100 may be a terminal device associated with a target vehicle 300. The target user device 100 may be, for example, an in-vehicle terminal of the target vehicle or a mobile terminal that is associated with the target vehicle 300 and is relatively stationary with respect to the target vehicle 300. For example, during driving, when a driver is to pick up a passenger, the driver usually fixes his/her mobile phone at a certain position (e.g., at a dashboard behind or near the steering wheel) in the vehicle, and does not move the phone for a long time. Therefore, the mobile phone may be the mobile terminal that is relatively stationary with respect to the target vehicle.

In 204, the at least one processor may obtain a plurality of second feature vectors corresponding to the plurality of sample data segments by extracting features from the plurality of sample data segments. The term "second feature vector" may refer to a feature vector for training an aforementioned heading classifier. In some embodiments, features extracted for generating a first feature vector and features extracted for generating a second feature vector may be of a same type or be extracted via a same or similar approach. In some embodiments, features extracted for generating a first feature vector and features extracted for generating a second feature vector may be of a different type or be extracted via different approaches.

In some embodiments, for each of the sample data segments, the at least one processor may determine M statistical values with respect to sampled magnetic flux densities along each of the three axes, so as to obtain a 3*M-dimensional feature vector (second feature vector) for each sample data segment.

In some embodiments, for each of the sample data segments, the at least one processor may determine the M statistical values for each of the x, y, and z axes.

In some embodiments, for each of the sample data segments, the M statistical values may include a mean, a variance, and a set of distribution statistics with respect to N (N+2=M) predetermined value ranges for the corresponding sampled magnetic flux densities along each of the x, y, and z axes, respectively.

It should be noted that, in the present disclosure, using the mean, the variance and the set of distribution statistics with respect to the sampled magnetic flux densities along each axis as the statistical values for determining the heading of the target vehicle or training the classifier is only for demonstration purposes. To implement the present disclosure, other types of statistics, such as a mode, a median, a range, a standard deviation, of the sampled magnetic flux densities included in a sample data segment along each of the axes, may also be used as the above statistical values in need. The embodiments of the present disclosure are not intended to be limiting.

In some embodiments, for each of the plurality of sample data segments, by determining a mean, a variance, and a set of distribution statistics with respect to N predetermined value ranges of the corresponding sampled magnetic flux densities along the x axis, the at least one processor may obtain an M-dimensional feature vector associated with the x axis. Similarly, for the each of the plurality of sample data segments, an M-dimensional magnetic data feature vector associated with the y axis and an M-dimensional magnetic data feature vector associated with the z axis may also be obtained accordingly. Thus, for each of the plurality of sample data segments, a 3*M-dimensional feature vector (second feature vector) may be obtained.

In 205, the at least one processor may obtain a classifier (heading classifier) for determining a heading of the target vehicle by performing, based on the labels and the plurality of second feature vectors corresponding to the plurality of sample data segments, a predetermined training routine of the classifier.

In some embodiments, after the labels and the plurality of second feature vectors corresponding to the plurality of sample data segments are obtained, the at least one process may perform the predetermined training routine of the classifier to obtain the heading classifier.

In some embodiments, the at least one processor may perform, based on the obtained labels and the plurality of second feature vectors corresponding to the plurality of sample data segments, a random forests algorithm or routine to train the heading classifier.

In some embodiments, the at least one processor may train a heading classifier including a plurality of decision trees based on the labels and the plurality of second feature vectors corresponding to the plurality of sample data segments. The heading class (predicted heading) outputted by the classifier may be based on a mode of candidate heading classes outputted by the plurality of decision trees, each of the plurality of decision trees may output one candidate heading for each sample data segment.

For example, the second feature vectors of the plurality of sample data segments and the corresponding labels may form a training dataset of the heading classifier (or be referred to as a forest-training dataset). For training the heading classifier, the at least one processor may train, based on the forest-training dataset, a plurality of decision trees (e.g., a classification and regression tree (CART)) to be included in the heading classifier.

For each decision tree of the heading classifier, the at least one processor may determine a training data set of the each decision tree (or be referred to as a tree-training dataset) based on the forest-training dataset of the heading classifier. In some embodiments, the at least one processor may adopt a bootstrap aggregating approach to determine a tree-training dataset. For example, for each decision tree of the heading classifier, the at least one processor may repeatedly select a random second feature vector and the corresponding label from the forest-training dataset with replacement. The selected second feature vectors and the corresponding labels may form the tree-training dataset of the each decision tree.

The at least one processor may train each decision tree with a corresponding tree-training dataset. During a training of a decision tree, the at least one processor may split nodes of the decision tree according to a metric of splitting associated with the decision tree. The metric may be a Gini impurity, an information gain, a variance reduction, etc., to be caused by the splitting. Two decision trees of the heading classifier may adopt a same metric or different metrics.

All the trained decision trees may together form the trained heading classifier. An output of the heading classifier may be a mode of outputs of all the decision trees. In some other embodiments of the present disclosure, the output of the heading classifier may also be a mean or a weighted mean of the outputs of all the decision trees.

It may be understood that, the heading classifier may also take other forms, such as supported vector machine (SVM), artificial neural network, a single decision tree, etc. Each form of the heading classifier may has its own training routine.

After the heading classifier is pre-trained via operations 201 to 205, the at least one processor may perform operations 206 to 210 to determine the current heading of the target vehicle at any time in need. The pre-trained heading classifier may be used in operation 209 for determining one or more predicted headings, based on which the heading of the target vehicle may be determined. Detailed descriptions of operations 206 to 210 may be found elsewhere in the present disclosure (e.g., in connection with FIG. 1).

As can be seen from the above description, via a process including retrieving the second sensor data generated by the magnetometer of the target user device, determining the standard heading of the target vehicle corresponding to the sample data segment as the label of the sample data segment, determining a 3*M-dimensional feature vector (second feature vector) for each of the plurality of sample data segments, and obtaining the heading classifier by performing, based on the labels and the plurality of second feature vectors corresponding to the plurality of sample data segments, the predetermined training routine of the classifier, the determination of the heading of the target vehicle may be achieved based on the sensor data generated by the magnetometer of the target user device with enhanced accuracy. In some embodiments, such an approach may save time for the driver and of the transportation service, and the travel efficiency of the passenger may be improved.

FIG. 5 is a schematic diagram illustrating an exemplary process for determining a set of distribution statistics of sampled magnetic flux densities along each of the three axes with respect to N predetermined value ranges according to some embodiments of the present disclosure. As shown in FIG. 5, in some embodiments, process 500 may be performed for determining the set of distribution statistics of the magnetic flux densities along each of the axes with respect to the N predetermined value ranges, and process 500 may include operations 501 and 502.

In some embodiments, one or more operations of process 500 illustrated in FIG. 5 may be implemented in the online-to-offline system 1400 illustrated in FIG. 14. For example, the process 500 illustrated in FIG. 5 may be stored in a storage device (e.g., memory 1030, non-volatile storage device 1020, storage device 1450) in the form of instructions, and may be invoked and/or executed by at least one processor (e.g., processor 1010 of the computing device 1000 as illustrated in FIG. 10).

In 501, the at least one processor may determine, based on the total value ranges of the sampled magnetic flux densities along the three axes, N (N=M−2) predetermined value ranges.

For example, when the total value range of the sampled magnetic flux densities along the three axes is (−60, 60), the at least one processor may determine the following N (e.g., N=8, or M=10) sub-ranges (the predetermined value ranges): (−∞, −45), [−45, −30), [−30, −15), [−15, 0), [0, 15), [15, 30), [30, 45), [45, +∞).

In 502, the at least one processor may obtain a set of distribution statistics by determining, for each of the axes, a distribution (e.g., a histogram) of the sampled magnetic flux densities among the predetermined value ranges.

In some embodiments, taking the determination of the distribution of the sampled magnetic flux densities along the x axis as an example, when the sampled magnetic flux densities along the x axis are: {−60, −30, −25, −30, −18, −50, 50, 45, 90, 78, 11, 36, 34, 98, −90, 78, 67, 56, 84, 39, 9, 4, 8, 2, 1, 78, 93, 20, 12, 19}, the distribution of the sampled magnetic flux densities among the above eight sub-ranges is: [3, 0, 4, 0, 7, 2, 3, 11], which is the N-dimensional (N=8) feature vector of the sampled magnetic flux densities along the x-axis. Further, by counting the mean and the variance of the sampled magnetic flux densities along the x axis, the at least one processor may obtain a 2-dimensional feature vector. Consequently, an M-dimensional (M=10) feature vector of the sampled magnetic flux densities along the x axis may be obtained (e.g., by concatenating the 8-dimensional feature vector and the 2-dimensional feature vector).

Similarly, a feature vector of the same dimension may be extracted for each of the y and z axis, and a 30-dimensional (3*10=30) second feature vector may be obtained for the three axes (e.g., by concatenating the three 10-dimensional feature vectors of the three axes).

As can be seen from the above description, in the present disclosure, via operations 501 and 502 including determining N predetermined value ranges based on the total value ranges of the sampled magnetic flux densities along the three axes, and determining, for each of the axes, the distribution of the sampled magnetic flux densities among the N predetermined value ranges, the set of distribution statistics of the sampled magnetic flux densities with respect to the N predetermined value ranges may be determined, and an accurate basis for the subsequent training of the heading classifier may be provided.

Figure 6:
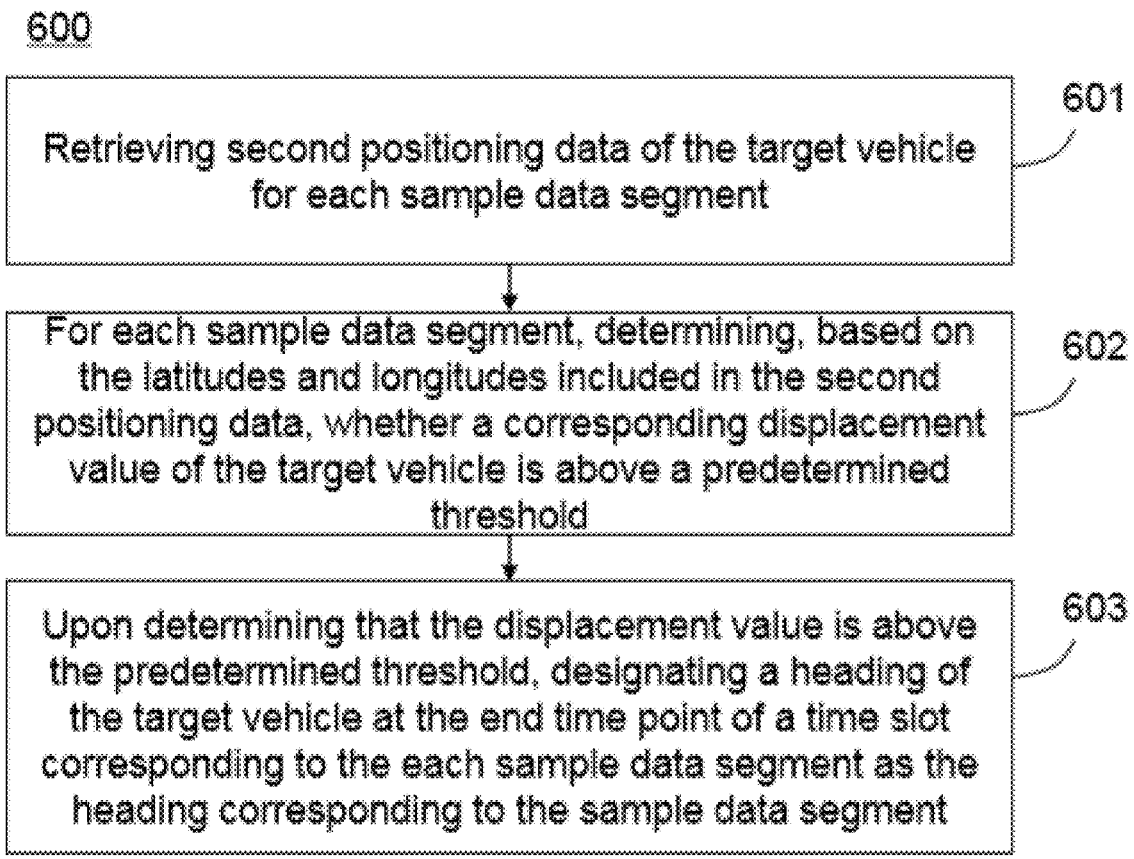
FIG. 6 is a schematic diagram illustrating an exemplary process for determining a standard heading of a target vehicle corresponding to each sample data segment according to some embodiments of the present disclosure.

FIG. 6 is a schematic diagram illustrating an exemplary process for determining a standard heading of a target vehicle corresponding to each sample data segment according to some embodiments of the present disclosure. As shown in FIG. 6, in some embodiments, process 600 may be performed to achieve step 203 illustrated in FIG. 2 for determining a standard heading of the target vehicle corresponding to each sample data segment. Process 600 may include operations 601-603.

In some embodiments, one or more operations of process 600 illustrated in FIG. 6 may be implemented in the online-to-offline system 1400 illustrated in FIG. 14. For example, the process 600 illustrated in FIG. 6 may be stored in a storage device (e.g., memory 1030, non-volatile storage device 1020, storage device 1450) in the form of instructions, and invoked and/or executed by at least one processor (e.g., processor 1010 of the computing device 1000 as illustrated in FIG. 10).

In 601, the at least one processor may retrieve second positioning data (e.g., GPS data) of the target vehicle for each sample data segment. In some embodiments, the second positioning data may include data representing direction and/or latitude & longitude of the target vehicle.

In some embodiments, as shown in FIG. 3, the at least one processor may retrieve the GPS data of the target vehicle 300 corresponding to the each sample data segment via a GPS receiver 320 in the target user device 310. In some embodiments, the GPS data may include one or more bearings, latitudes, and longitudes of the target user device 310 (or the target vehicle 300). A bearing may represent a moving direction of the target user device 310 or the target vehicle 300

In some embodiments, for example, the target user device 310 may include an ANDROID system, and the one or more bearings included in the GPS data may be obtained using a function "location.getBearing( )" included in a positioning service provided by the ANDROID system.

In 602, the at least one processor may determine, for the each sample data segment, based on the one or more latitudes and longitudes included in the second positioning data, whether a corresponding displacement value (second displacement value) of the target vehicle is above a predetermined second threshold.

The displacement value may be a displacement value of the target vehicle over a predetermined time interval (or a third time slot) corresponding to the sample data segment.

In some embodiments, within the predetermined time interval (third time slot), the at least one processor may determine a displacement value of the target vehicle at a certain time point based on the latitude and longitude of the target vehicle at the certain time point and the latitude and longitude of the target vehicle at a previous time point (e.g., the last sampling time point of the GPS receiver 320 or any other predetermined time point). Similarly, the at least one processor may determine a displacement value of the target vehicle within the predetermined time interval.

For example, the at least one processor may determine the displacement value of the target vehicle within the predetermined time interval (third time slot) based on the latitude & longitude of the target vehicle at the end time point of the predetermined time interval and the latitude & longitude of the target vehicle and the start time point of the predetermined time interval. Alternatively, the at least one processor may set a plurality of reference time point within the predetermined time interval, determine a displacement value of the target vehicle of each reference time point with respect to a last reference time point, and designate a sum of the determined displacement values as the displacement value of the target vehicle within the predetermined time interval.

In some embodiments, when the GPS signal is poor or cannot be received, the at least one processor may set the displacement value of the target vehicle at a corresponding time point or within a corresponding time interval (e.g. third time slot) as zero.

In some embodiments, after the displacement value of the target vehicle within the predetermined time interval (third time slot) is determined, the at least one processor may compare the displacement value with the second threshold (e.g., 10 m) to determine whether the displacement value is above the predetermined threshold.

In 603, the at least one processor may designate, upon determining that the displacement value is above the second threshold, a heading (e.g., the bearing of GPS data) of the target vehicle at the end time point of a time slot (third time slot) corresponding to the each sample data segment as the heading (or label) corresponding to the each sample data segment. Such a heading may also be referred to as a preliminary standard heading.

In some embodiments, if it is determined that the displacement value is above the second threshold (e.g., the displacement value is 15 m>10 m), the at least one processor may determine the heading of the sample data segment based on the bearing of the GPS data corresponding to the end time point of the each sample data segment.

In some embodiments, in operation 603, to determine the heading of the sample data segment based on the bearing of the GPS data corresponding to the end time point of the data segment, the at least one processor may round the bearing of the GPS data at the end time point (preliminary standard heading) of each sample data segment to a nearest standard value of a heading value set. The heading value set may be automatically or manually predetermined as a result of a dividing of the value range of the heading.

For example, a value range of a bearing of GPS data may be [0, 360) degrees. The bearing of the true north is 0 degree, the bearing of the true east is 90 degrees, and the bearing of the true west is 270 degrees.

In some embodiments, the at least one processor may roughly pre-divide the value range of the heading for determining, for example, 18 standard values: {0, 20, 40, 60, 80, 100, 120, 140, 160, 180, 200, 220, 240, 260, 280, 300, 320, 340}. Each of the standard values may represent a heading or a heading class.

For example, if a bearing of GPS data (preliminary standard heading) corresponding to a sample data segment is 31 degrees, it may be round to 40 degrees. As another example, if a bearing value of GPS data corresponding to a sample data segment is 75 degrees, it may be round to 80 degrees. The rounding of the preliminary standard heading may also be viewed as a classification of the preliminary standard headings into one of a plurality of heading classes corresponding to the standard values. The at least one processor may designate a standard value corresponding to the heading class of the preliminary standard heading as the standard heading of the corresponding sample segment.

In some embodiments, besides the displacement value, the at least one processor may determine a heading (or label) for a sample data segment based further on the driving state (e.g., accelerating, braking, steering, parking, backing, drifting) of the target vehicle. For example, when the vehicle is backing, the at least one processor may designate an opposite direction (rounded) of the bearing indicated by the GPS data as a label of the corresponding sample data segment. As another example, when the vehicle keep performing sudden steering or drifting, the at least one processor may discard the corresponding sample data segments without (or after) determining a label for them.

The target user device (e.g., the target user device 310) for generating the first or second sensor data may further include means for determining the driving manner of the target vehicle. For example, the target user device may include an accelerometer and/or an angular accelerometer (e.g., a gyroscope) for sensing the driving state of the target vehicle. Alternatively or additionally, the target vehicle (or one or more sensor installed on the target vehicle) may transmit signals for indicating the driving state (e.g., reversing, steering, parking) of the target vehicle to the target user device or the at least one processor.

The at least processor may further determine the heading of the target vehicle based on the driving state. For example, when the target vehicle keep performing sudden steering or drifting, the at least one processor may use only one predicted heading or fewer predicted headings to determine the result heading of the vehicle. Alternatively or additionally, the at least one processor may assign a higher weight for a predicted heading corresponding to a more proximate time slot.

As can be seen from the above description, in the present embodiment, via a process including retrieving GPS data of the target vehicle corresponding to each sample data segment; determining, for the each sample data segments, whether the corresponding displacement value of the target vehicle is above a predetermined threshold based on the latitudes and longitudes included in the GPS data, and determining a corresponding heading for the each sample data segment based on the bearing of the GPS at the end of each sample data segment, the heading of the target vehicle corresponding to each sample data segment may be accurately determined, providing accurate basis for the subsequent training of the heading classifier.

For demonstration purposes, an exemplary embodiment of the present disclosure is described as following, which is not intended to limit the scope of the present disclosure.

Figure 7:
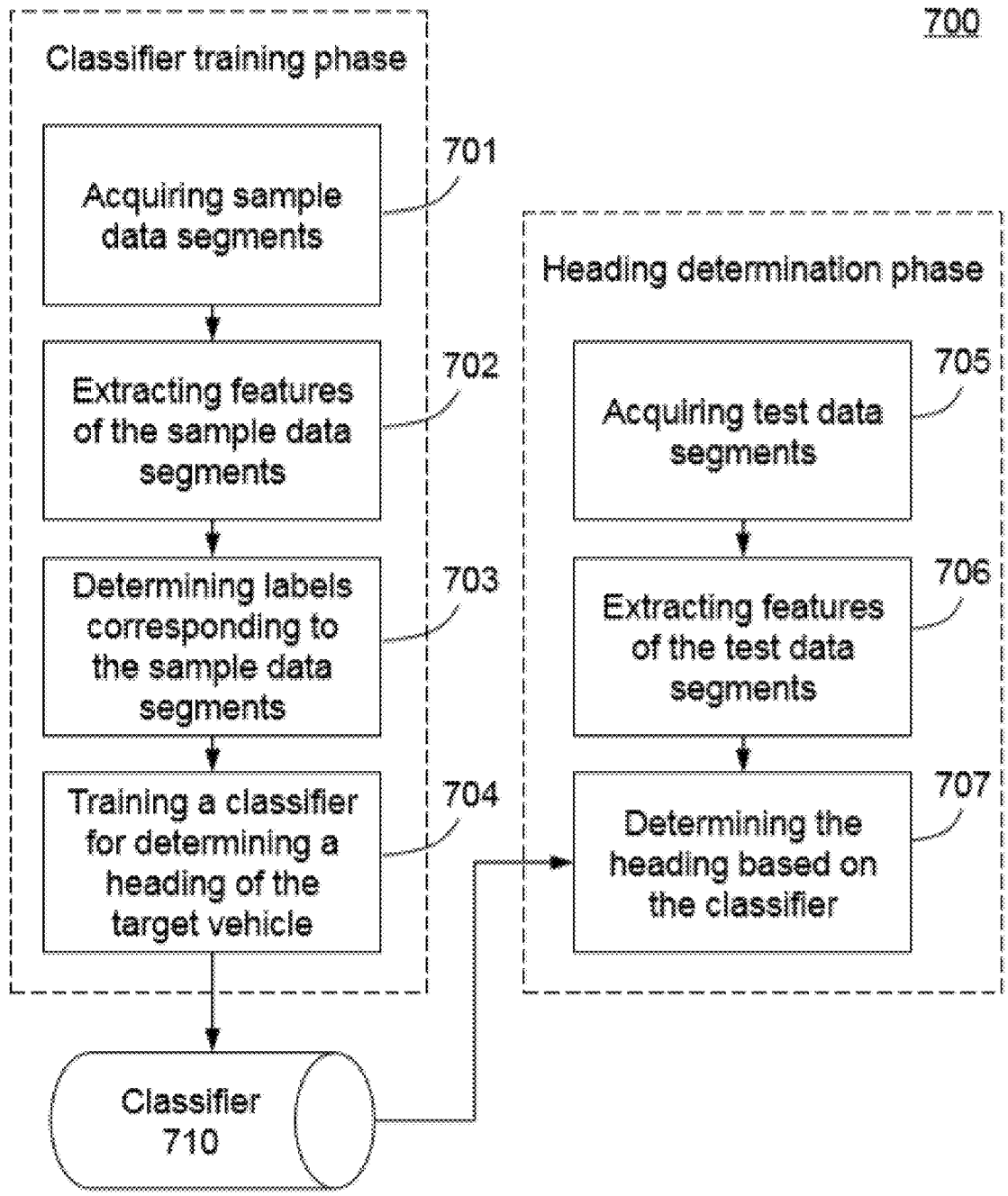
FIG. 7 is a schematic diagram illustrating an exemplary process for training a heading classifier according to some embodiments of the present disclosure.

FIG. 7 is a schematic diagram illustrating an exemplary process for training a heading classifier according to some embodiments of the present disclosure. Process 500 may be performed for training a heading classifier 710 and determining a heading of a vehicle based on the trained heading classifier 710. In some embodiments, one or more operations of process 700 illustrated in FIG. 7 may be implemented in the online-to-offline system 1400 illustrated in FIG. 14. For example, the process 700 illustrated in FIG. 7 may be stored in a storage device (e.g., memory 1030, non-volatile storage device 1020, storage device 1450) in the form of instructions, and invoked and/or executed by at least one processor (e.g., processor 1010 of the computing device 1000 as illustrated in FIG. 10). As shown in FIG. 5A, the heading determination may include two phases: (I) classifier training phase and (II) heading determination phase.

(I) Classifier training phase.

In the classifier training phase, the at least one processor may perform operations as following.

In operation 701, the at least one processor may acquire a plurality of sample data segments.

In some embodiments, the at least one processor may acquire the sensor data sampled by the magnetometer (e.g., with a sampling frequency 10 HZ) and GPS data sampled by the GPS receiver (e.g., with a sampling frequency 1 HZ) of a mobile phone of a driver.

In some embodiments, the at least one processor may divide the collected sensor data into the plurality of sample data segments by 3 seconds.

In some embodiments, the at least one processor may determine, for each sample data segment, a displacement value of the target vehicle based on GPS data of the corresponding 3 seconds. Upon determining a displacement value (e.g., determined based on latitude and longitude of the GPS data) less than 10 m (or any other second threshold value), the at least one processor may discard the corresponding sample data segment. That is, upon determining that the second displacement value is less than or equal to the second threshold, the at least one processor may exclude the sensor data of the corresponding third time slot from being used to generate the training dataset.

In operation 702, the at least one processor may extract features of the sample data segments.

For each sample data segment, the at least one processor may determine a mean, a variance, and a histogram for the sensor datums included in the sample data segment along the x, y, and z axes.

In some embodiments, the maximum value and the minimum value for a value (or be referred to as a sampled value, e.g., a sampled magnetic flux density, a signal intensity) of a sensor datum may be 60 and −60, respectively, and the number of bins of the histogram may be configured as 8. Correspondingly, the at least one processor may extract a second feature vector of 3*(2+8)=30 dimensions from each sample data segment.

For example, if the number of samplings performed for a 3-second sample data segment is 30 (the sampling frequency of the magnetometer is 10 Hz, i.e., 10 samplings are performed per second), then the at least one processor may acquire 30 sampled values along each of the 3 directions for the sample data segment.

In some embodiments, by taking the x axis as an example (the operations performed for the y and z axes are similar to the ones performed for the x axis), the at least one processor may determine, by dividing the value range of the sampled values along the x axis, eight value ranges (or sub-ranges) as following:

(−∞, −45), [−45, −30), [−30, −15), [−15, 0), [0, 15), [15, 30), [30, 45), [45, +∞).

In some embodiments, the at least one processor may determine a distribution (e.g., a histogram) of the 30 sampled values of the sample data segment along the x axis among the 8 sub-ranges.

For example, if the sampled values along the x axis are: {−60, −30, −25, −30, −18, −50, 50, 45, 90, 78, 11, 36, 34, 98, −90, 78, 67, 56, 84, 39, 9, 4, 8, 2, 1, 78, 93, 20, 12, 19}, then the distribution (or be referred to as a histogram feature vector) of the sampled values among the 8 sub-ranges may be [3, 0, 4, 0, 7, 2, 3, 11].

Accordingly, the at least one processor may obtain a histogram feature vector along the x axis for the sensor datums included in the sample data segment.

Similarly, the at least one processor may obtain a histogram feature vector of the same dimension along each of the y and z axes.

In some embodiments, the total dimension of the histogram feature vectors along the 3 axis is 3*8=24. With the means and the variances of the 3 axes (3*2), a total dimension of a combined feature vector (second feature vector) may be 30.

In some embodiments, the at least one processor may perform the feature extraction on the sample data segments one by one. The sample data segments may not overlap in time.

In some embodiments, the sample data segments may be partially overlapped. For example, there may be a 0.1 s (or any other proper number) overlap in time between two adjacent 3-second sample data segments. And a 30 s sensor data (first sensor data or second sensor data) may be "divided" into (or be used to generate) 11 sample data segments.

In 703, the at least one processor may determine labels corresponding to the sample data segments.

In some embodiments, the at least one processor may determine a heading of a sample data segment based on a bearing direction of GPS data corresponding to an end time point (e.g., the third second) of each sample data segment as a label of the corresponding second feature vector.

In some embodiments, the at least one processor may roughly divide the value range of the heading into 18 standard values (or heading classes). For example, a determination result may be: {0, 20, 40, 60, 80, 100, 120, 140, 160, 180, 200, 220, 240, 260, 280, 300, 320, 340}.

In 704, the at least one processor may train a classifier for determining a heading of the target vehicle.

In some embodiments, only the sampled data (sensor data and/or GPS data) of the latest, for example, 200 sample data segments (corresponding to a time slot of 600 seconds) may be retained (e.g., stored in a storage device such as memory 1030, non-volatile storage device 1020, storage device 1450) for each heading class (or standard value), that is, a count of samples labeled as to be classified into the each heading class may be 200. When the number of retained samples reaches a predetermined number 3,600 for the first time, or more than, for example, 30 minutes have passed since the last training, the at least one processor may train, e.g., via a random forests approach, a new heading classifier (e.g., for replacing the old one) based on the determined second feature vectors and labels of the sample data segments.

The at least one processor may adopt various forest-training dataset updating strategies and/or various classifier updating strategies for updating the heading classifier. For demonstration purposes and not intended to be limiting, exemplary forest-training dataset updating strategies and classifier updating strategies are provided as following.

In some embodiments, the at least one processor may keep adding sample data segment into the forest-training dataset until the forest-training dataset is full, and then train the heading classifier with the full forest-training dataset.

For example, for each of the heading classes, only a predetermined number (e.g., 200) of sample data segments may be retained. When the number of the retained sample data segments of a heading class A reaches such a predetermined number, the at least one processor may treat a corresponding sub-dataset of the forest-training dataset as "full". The at least one processor may continue adding a new sample data segment labeled as belonging to the heading class A into the forest-training dataset while removing or deleting the oldest stored sample data segment labeled as belonging to the heading class A. Alternatively, the at least one processor may stop adding new sample data segments labeled as belonging to the heading class A into the forest-training dataset. When the sub-datasets corresponding to all the heading classes of the forest-training dataset are full, the at least one processor may treat the forest training dataset as full, and train the heading classifier with the full forest-training dataset.

In some embodiments, after training the heading classifier with the forest-training dataset, the at least one processor may purge the forest-training dataset by removing or deleting at least a portion of (or all of) the existing sample data segments in the forest-training dataset. The at least one processor may start adding new sample data segments into the cleaned forest-training dataset. When the forest-training dataset is full again. The at least one processor may train a new heading classifier with the updated forest-training dataset. Alternatively or additionally, when a certain time period (e.g., 30 min) has passed, the at least one processor may train a new heading classifier with the current forest-training dataset (which may also be treated as the updated forest-training dataset), even if the current forest-training dataset is not full.

Alternatively or additionally, the at least one processor may keep updating the forest-training dataset. For each heading class, the oldest sample data segment may be readily replaced by the latest sample data segment. When the whole forest-training dataset has been fully updated (i.e., all the sample data segments have been replaced by new ones since the last training), the at least one processor may train a new heading classifier with the fully-updated forest-training dataset. Alternatively or additionally, when a certain time period (e.g., 30 min) has passed, the at least one processor may train a new heading classifier with the current forest-training dataset, even if the forest-training dataset is not fully-updated.

To train a new heading classifier, the at least one processor may train a plurality of new decision trees in a process as mentioned before. The new heading classifier may include only new decision trees. For example, a heading classifier may include 100 decision trees (or any other proper number). Each time a new heading classifier is to be trained, the at least one processor may train 100 new decision trees, which may form the new heading classifier. Alternatively or additionally, the at least one processor may train a new heading classifier in an updating manner, i.e. the new heading classifier may also include a plurality of old decision trees of the old heading classifier. For example, each time a new heading classifier is to be trained, the at least one processor may train 50 new decision trees (e.g., 10%, 20%, 50%, 80% of the total number of decision trees). With 50 old decision trees of the old heading classifier, the at least one processor may build a new heading classifier having 100 decision trees altogether. In some embodiments, the at least one processor may randomly select old decision trees to be included in the new heading classifier. Alternatively, the at least one processor may select the latest-trained old decision trees, or the ones having the highest heading prediction accuracy (e.g., the ones whose output is also the output of the whole old heading classifier most of the time).

(II) Heading Determination Phase.

In the heading determination phase, the at least one processor may perform operations as following.

In operation 705, the at least one processor may acquire one or more test data segments.

In some embodiments, the at least one processor may acquire sensor data from a mobile phone of a driver. (e.g., via a magnetometer of the mobile phone) The sensor data may include magnetic flux densities along the x, y, and z axes of the target user device in units of Tesla.

In operation 706, the at least one processor may obtain one or more feature vectors by extracting features from the one or more test data segments.

For each of the one or more test data segments, the at least one processor may determine a mean, a variance and histogram statistics for the acquired sensor data along each of the x, y, and z axes. The bin number of the histogram may be 8. Therefore, a 3*(2+8)=30-dimensional feature vector may be obtained.

In operation 707, the at least one processor may determine a heading of the target vehicle based on the classifier In some embodiments, the at least one processor may obtain a heading (or predicted heading) by inputting a feature vector of each of the test data segments into the aforementioned trained classifier 710, such as a random forest based classifier. Then the at least one processor may obtain a result heading based on the obtained predicted heading(s) according to process 100 or any other similar process.

In some embodiments, the at least one processor may determine a result heading for the target vehicle every 200 milliseconds (regardless whether a bearing direction of GPS is reliable).

The result of a single determination may not be accurate due to errors on GPS data and sensor data. Therefore, in some embodiments of the present disclosure, the at least one processor may determine sums of weights (or weighted voting) for a plurality of historically determined headings (e.g., prior determined result headings that are determined, for example, in the latest 2 second), so as to determine a result heading at the current time.

Figure 8:
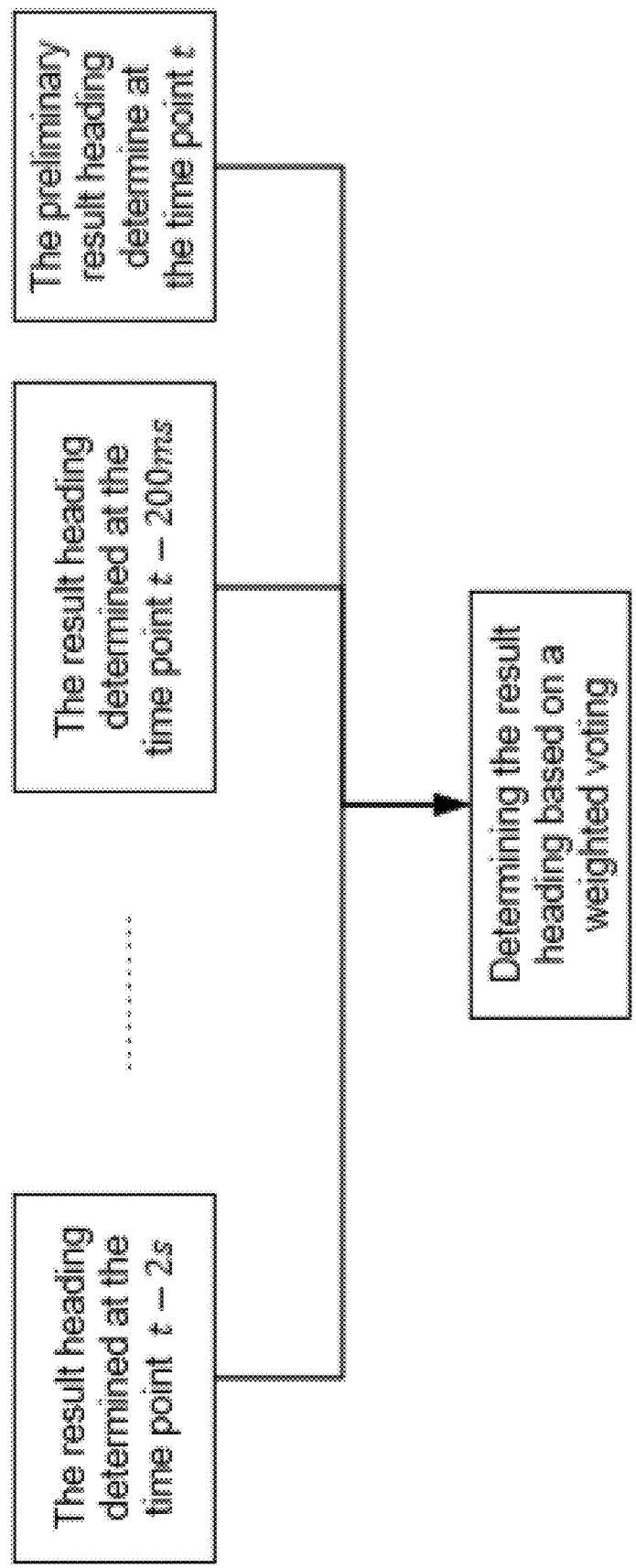
FIG. 8 is a schematic diagram illustrating an exemplary determination of a result heading based on a plurality of historically determined headings according to some embodiments of the present disclosure.

FIG. 8 is a schematic diagram illustrating an exemplary determination of a result heading based on a plurality of historically determined headings according to some embodiments of the present disclosure. For example, as shown in FIG. 8, the at least one processor may determine a sum of weights (or perform a weighted voting) for each unique result heading (or the corresponding heading classes) of 10 (or any other proper number) latest determined result headings (including the heading determined at the current time point (or be referred to as a preliminary result heading) and other result headings determined within the latest, e.g., two seconds).

The preliminary result heading may be a "result heading" determined at the current time point (e.g., time point t) according to process 100 or any other similar processes without considering historically determined result headings.

For example, the weight associated with the preliminary result heading may be set as 1, and the weights associated with prior determined result headings may be decreasing with a common difference as 0.1 (that is, the weight of the previous result heading is 0.9, the weight of the next previous result heading is 0.8, and so on) or any other proper value (e.g., 0.15, 0.2, 0.3).

It may be noted that, the weight associated with a result heading may also be determined in any other way. For example, the weight associated with the preliminary result heading may be set as 1, and the weights associated with prior determined result headings may be decreasing with a common ratio as 0.8 (that is, the weight of the previous result heading is 0.8, the weight of the next previous result heading is 0.64, and so on) or any other proper value (e.g., 0.9, 0.6, 0.5).

After the weighted voting is completed, the at least one processor may designate a heading with the highest sum of weights as the current result heading.

For example, if the 10 latest determined result headings are: [20, 40, 20, 60, 90, 20, 40, 40, 0, 20], and the corresponding predetermined weights are [0.1, 0.2, 0.3, 0.4, 0.5, 0.6, 0.7, 0.8, 0.9, 1.0], the sum of weights of the heading 20 is 0.1+0.3+0.6+1.0=2.0; the sum of weights of the heading 40 is 0.2+0.7+0.8=1.7; the sum of weights of the heading 60 is 0.4; the sum of weights of the heading 90 is 0.5; and the sum of weights of the heading 0 is 0.9. Consequently, the at least one processor may determine the result heading at the current time point as the heading 20 with the highest sum of weight.

In some embodiments, the preliminary result heading may be determined based on a plurality of (e.g., 10 or any other proper number) predicted headings. One predicted heading may be determined based on one test data segment. Alternatively, the preliminary result heading may be determined based on only one predicted heading. The dividing of the first sensor data (as well as the dividing of the second sensor data) may not be performed, and the at least one processor may directly retrieve sensor data of a corresponding time slot (first time slot) and determine the only one predicted heading by inputting the sensor data into the heading classifier. The weighted voting of the historically determined result headings may be similar to the weighted voting of the predicted headings for determining a result heading as described in connection with FIG. 1, except that in the weighted voting of the historically determined result headings, each of the historically determined result heading is a result of a corresponding weighted voting.

Figure 9:
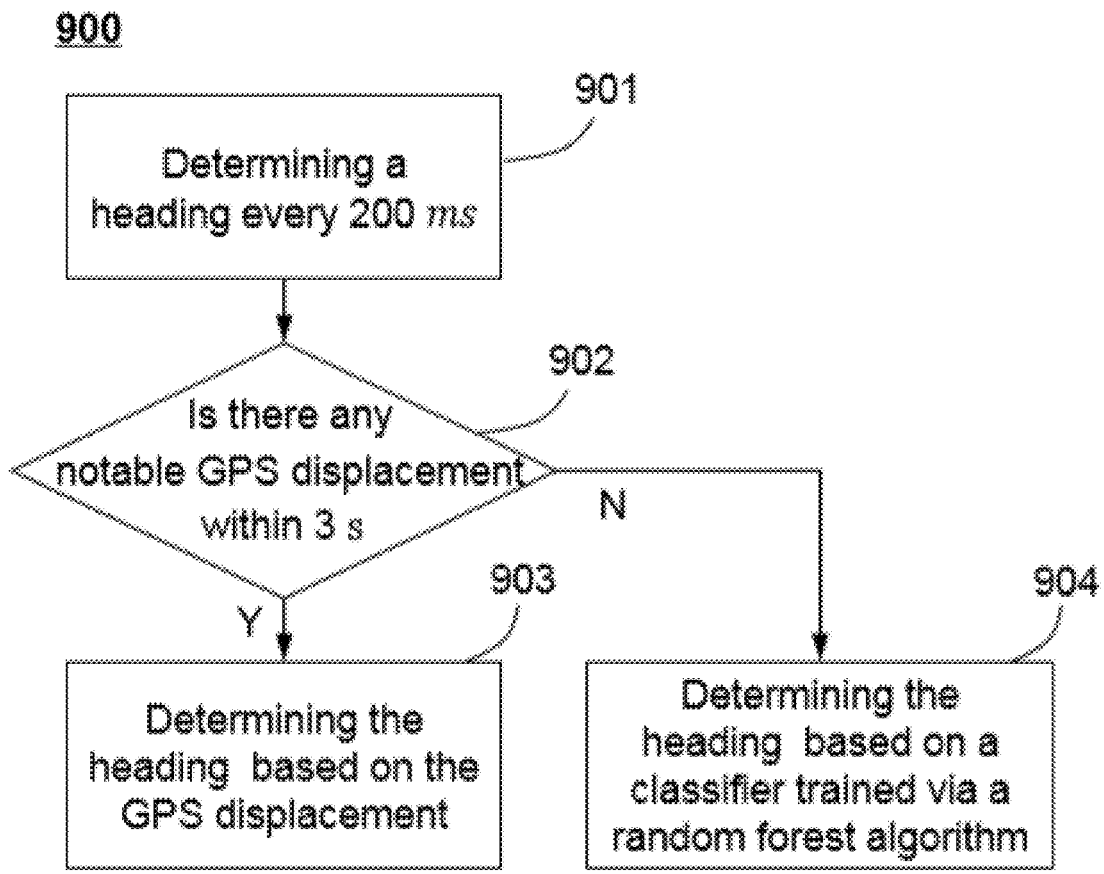
FIG. 9 is a schematic diagram illustrating an exemplary heading determination method according to some embodiments of the present disclosure.

FIG. 9 is a schematic diagram illustrating an exemplary heading determination method according to some embodiments of the present disclosure. Process 900 may be a combination of a heading determination based on sensor data generated by the magnetometer of the target user device and a heading determination based on GPS data. As shown in FIG. 9, process 900 may include operations 901 to 904 as following.

In 901, the at least one processor may determine a heading (a result heading) of the target vehicle, for example, every 200 milliseconds.

In 902, the at least one processor may determine whether there is any notable GPS displacement (e.g., above 10 meters) within 3 seconds (or any other proper time interval);

In 903, upon determining that there is a notable GPS displacement within 3 seconds, the at least one processor may determine the result heading based on the GPS displacement; and In 904, otherwise, the at least one processor may determine the result heading based on a heading classifier trained via, for example a random forest algorithm via a process described in connection with FIGS. 1, 2, 7, and/or 8.

As can be seen from the above descriptions, in the present embodiment, via a process including acquiring sensor data with a mobile phone of a driver, designating, to each sample data segment, a corresponding standard heading of a target vehicle as a corresponding label, obtaining a heading classifier for the target vehicle by performing a random forests algorithm based on the label and feature vector corresponding to each of the sample data segments, and determining, in response to a request for determining the heading of the target vehicle, a result heading of the target vehicle using the trained heading classifier, the accuracy of the heading determination may be improved, and the time costs of the driver and the passenger for providing or receiving the transportation service may be saved, and the travel efficiency of the passenger may be improved.

According to some embodiments of the present disclosure, heading determination devices for performing processes described in the present disclosure are provided hereafter. One or more of the heading determination devices may be implemented by any device (e.g., the server 1410, the provider terminal 1440) capable of accessing a network (e.g., network 1420). One or more of the heading determination devices may be implemented by software, hardware, or a combination thereof. For example, in terms of software, a heading determination device may be a logical device implemented by a processor (e.g., the processor 1010) of a corresponding computing device (e.g., the computing device 10 illustrated in FIG. 10) via executing corresponding computer readable instructions loaded from a non-volatile storage into a memory. In terms of hardware, an exemplary hardware structure of a device for implementing the heading determination device is illustrated in FIG. 10.

FIG. 10 is a schematic diagram illustrating an exemplary computing device. Computing device 1000 may be configured to implement the heading determination device and perform one or more operations disclosed in the present disclosure. The computing device 1000 may include a bus 1070, a processor 1010, a memory 1030 (e.g., a read only memory (ROM), a random access memory (RAM)), a non-volatile storage device 1020 (e.g., massive storage device such as a hard disk, an optical disk, a solid-state disk, a memory card, etc.), and a network interface 1060. It may be noted that, the architecture of the computing device 1000 illustrated in FIG. 10 is only for demonstration purposes, and not intended to be limiting. The computing device 1000 may be any device capable of performing a computation.

In some embodiments, the computing device 1000 may be a single device.

Alternatively, the computing device 1000 may include a plurality of computing devices having a same or similar architecture as illustrated in FIG. 10, and one or more components of the computing device 1000 may be implemented by one or more of the plurality of computing devices.

The bus 1070 may couple various components of computing device 1000 and facilitate transferring of data and/or information between them. The bus 1070 may have any bus structure in the art. For example, the bus 1070 may be or may include a memory bus and/or a peripheral bus.

The network interface 1060 may allow a transferring of data and/or information between a network (e.g., the network 1420) and the bus 1070. For example, the network interface 1060 may be or may include a network interface card (NIC), a Bluetooth™ module, an NFC module, etc.

The memory 1030, and/or the non-volatile storage device 1020 may be configured to store computer readable instructions 1031 that may be executed by the processor 1010 to implement the heading determination device described in the present disclosure. The memory 1030, and/or the non-volatile storage device 720 may also store date and/or information generated by the processor 1010 during the execution of the instructions 1031.

The processor 1010 may be or include any processor (single-cored or multi-cored) in the art configured to execute computer readable instructions (e.g., stored in the memory 1030, and/or the non-volatile storage device 1020), so as to perform one or more operations or implement one or more modules/units disclosed in the present disclosure. For example, the processor 1010 may perform a heading determination in a process illustrated in FIGS. 1, 2, 7, 8, and 9. Merely by way of example, the processor 1010 may be or include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

In addition to the processor 1010, the network interface 1060, the memory 1030 and the non-volatile storage device 1020 illustrated in FIG. 10, the device for implementing the heading determination device may also include other hardware components, such as a chip configured to forward and/or process packets. The device for implementing the heading determination device may also be a distributed device that includes a plurality of interface cards for distributing the processing of packets at a hardware level. In some embodiments, the device for implementing the heading determination device may be a server (e.g., server 1410). Alternatively or additionally, the device for implementing the heading determination device may be a mobile computing device (e.g., the provider terminal 1440).

According to some embodiments of the present disclosure, a computer readable medium (e.g., the memory 1030 or the non-volatile storage device 1020) including instructions (e.g., in the form of a computer program or a mobile application) is provided as following. When the program is executed by a processor (e.g., the processor 1010), the processor may cause a corresponding device or system to perform a heading determination described as following, including: retrieving, in response to a received request for determining a heading of a target vehicle, first sensor data generated, by a magnetometer of a target user device, within a first predetermined time period before the current time, wherein the target user device is associated with the target vehicle; dividing the first sensor data into a plurality of test data segments based on a predetermined time interval; obtaining a first plurality of feature vectors corresponding to the plurality of first feature vectors by extracting features from the plurality of test data segments; generating a plurality of predicted headings by inputting the first plurality of feature vectors into a classifier; and determining a result heading of the target vehicle based on the plurality of predicted headings.

The aforementioned heading determination processes may be implemented by exemplary devices described as following, which are only for demonstration purposes and not intended to be limiting. Detailed descriptions of modules and units included in the following devices may be found elsewhere in the present disclosure and are not repeated herein.

Figure 11:
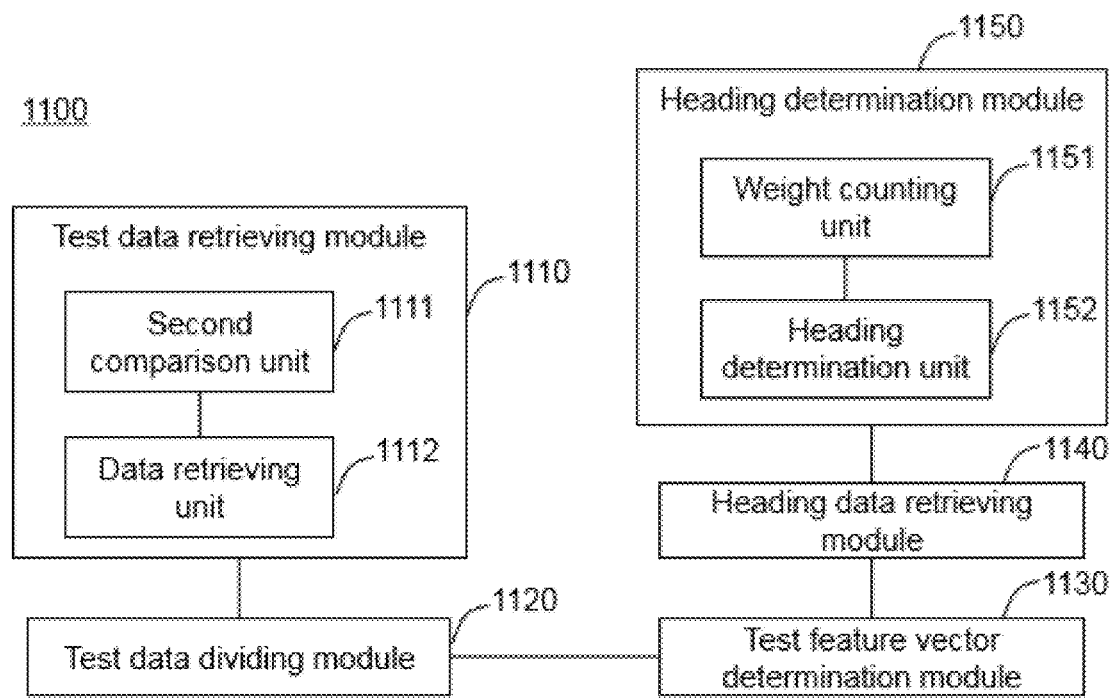
FIG. 11 is a schematic diagram illustrating an exemplary device for heading determination according to some embodiments of the present disclosure.

FIG. 11 is a schematic diagram illustrating an exemplary device (device 1100) for heading determination according to some embodiments of the present disclosure. The device 1100 may be implemented by one or more computing devices (e.g., the computing device 1000, the server 1420, the provider terminal 1440) to perform one or more corresponding operations of an aforementioned process (e.g., process 100). As shown in FIG. 11, the device 1100 may include a test data retrieving module 1110, a test data dividing module 1120, a test feature vector determination module 1130, a heading data retrieving module 1140, and a heading determination module 1150.

The test data retrieving module 1110 may be configured to retrieve, in response to a received request for determining a heading of a target vehicle, first sensor data generated, by a magnetometer of a target user device, within a first predetermined time period before the current time, wherein the target user device may be associated with the target vehicle.

The test data dividing module 1120 may be configured to divide the first sensor data into a plurality of test data segments based on a first predetermined time interval.

The test feature vector determination module 1130 is configured to obtain a plurality of first feature vectors corresponding to the plurality of first feature vectors by extracting features from the plurality of test data segments.

In some embodiments, the test feature vector determination module 1130 may be configured to determine, for each of the plurality of test data segments, M statistical values with respect to sampled magnetic flux densities along each of the three axes, so as to obtain a 3*M-dimensional feature vector for each test data segment.

The heading data retrieving module 1140 may be configured to generate a plurality of predicted headings by inputting the plurality of first feature vectors into a classifier, wherein the classifier may be pre-trained to determine the heading of the target vehicle based on sensor data generated by the target user device.

The determination module 1150 may be configured to determine a result heading of the target vehicle based on the plurality of predicted headings.

As can be seen from the above description, in the present disclosure, via a process including retrieving the first sensor data by the magnetometer of the target user device within the first predetermined time period before the current time point, extracting a feature vector (first feature vector) from each of the plurality of data segments of the first sensor data, and inputting the plurality of first feature vectors of the plurality of data segments into the heading classifier, the heading of the target vehicle may be determined based on the sensor data generated by the magnetometer with enhanced accuracy. In some embodiments, such an approach may save time for the driver and of the transportation service, and the travel efficiency of the passenger may be improved.

As shown in FIG. 11, in some embodiments, the heading determination module 1150 may include a weight counting unit 1151 and a heading determination unit 1152.

The weight counting unit 1151 may be configured to determine, for each unique heading of the plurality of predicted headings, a sum of weights based on a predetermined weight corresponding to the each of the plurality of test data segments.

The heading determination unit 1152 may be configured to determine the result heading of the target vehicle based on the sum of weights of the each unique heading of the plurality of predicted headings.

In some embodiments, the test data retrieving module 1110 may include a second comparison unit 1111 and a data retrieving unit 112.

The second comparison unit 111 may be configured to determine, in response to receiving the request for determining the heading of the target vehicle, whether a current displacement value of the vehicle is less than a predetermined first threshold, wherein the current displacement value may be a displacement value of the vehicle within a predetermined time interval before the current time point.

The data retrieving unit 112 may be configured to retrieve, in response to determining that the current displacement value is less than the first threshold, the first sensor data generated by the magnetometer of the target user device within the first predetermined time period before the current time point.

Figure 12:
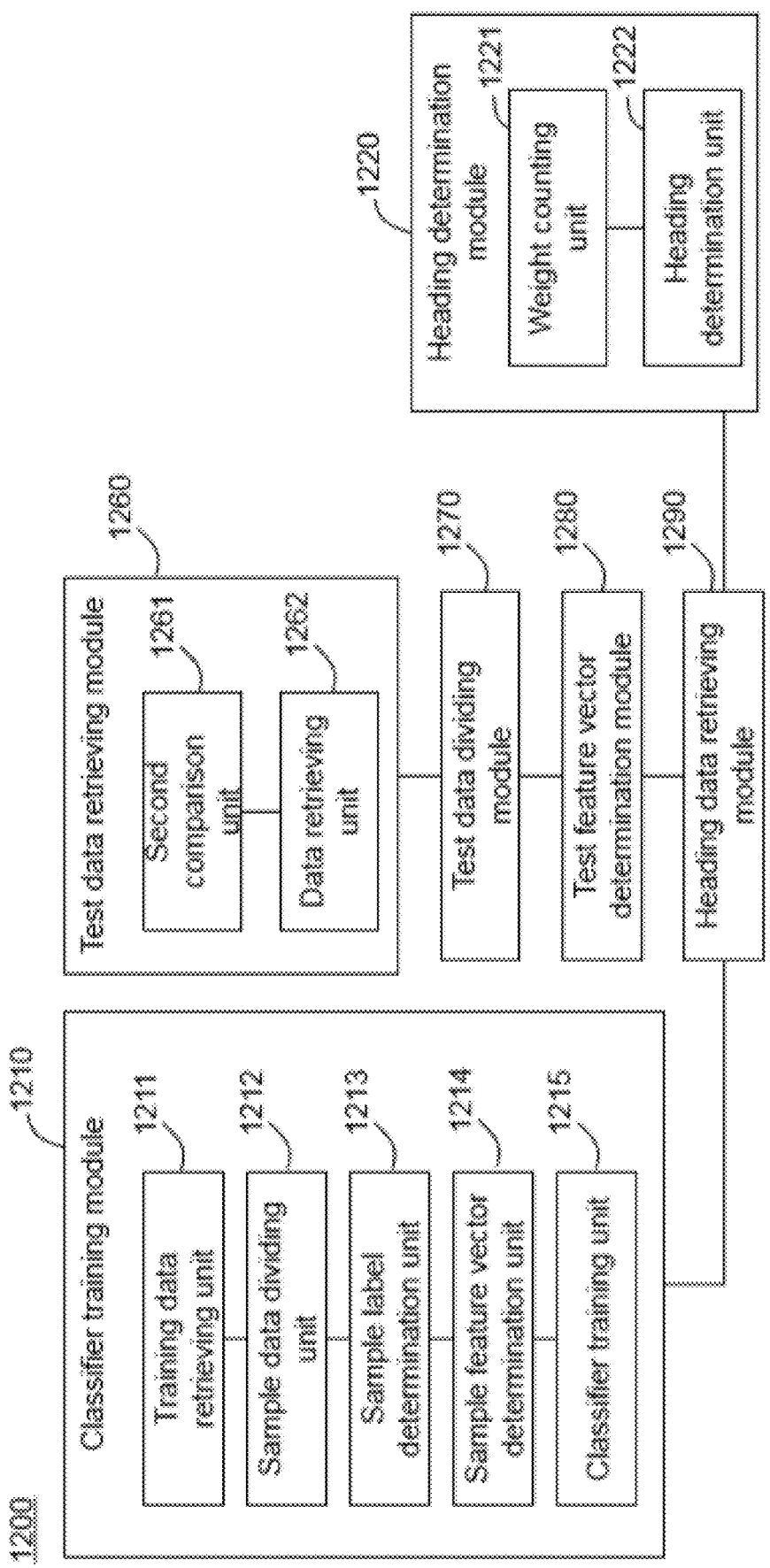
FIG. 12 is a schematic diagram illustrating an exemplary device for heading determination according to some embodiments of the present disclosure.

FIG. 12 is a schematic diagram illustrating an exemplary device (device 1200) for heading determination according to some embodiments of the present disclosure. The device 1200 may be implemented by one or more computing devices (e.g., the computing device 1000, the server 1420, the provider terminal 1440) to perform one or more corresponding operations of an aforementioned process (e.g., process 200). Test data retrieving module 1260 (including second comparison unit 1261 and data retrieving unit 1262), test data dividing module 1270, test feature vector determination module 1280, heading data retrieving module 1290, and heading determination module 1220 (including weight counting unit 1221 and heading determination unit 1222) included in device 1200 may be the same as or similar to the test data retrieving module 1110 (including the second comparison unit 1111 and the data retrieving unit 1112), the test data dividing module 1120, the test feature vector determination module 1130, the heading data retrieving module 1140, and the heading determination module 1150 (including the weight counting unit 1151 and the heading determination unit 1152) as illustrated in FIG. 11, respectively, and the descriptions of which are not repeated herein. As shown in FIG. 12, the device 1200 may further include a classifier training module 1210 for pre-training the aforementioned classifier. The classifier training module may include a training data retrieving unit 1211, a sample data dividing unit 1212, a sample label determination unit 1213, a sample feature vector determination unit 1214, and a classifier training unit 1215.

The training data retrieving unit 1211 may be configured to retrieve second sensor data generated, by a magnetometer of a target user device, within a second predetermined time period, wherein the second sensor data may include sensor datums representing magnetic flux densities along each of the x, y, and z axes with respect to the target user device.

The sample data dividing unit 1212 may be configured to divide the second sensor data into a plurality of sample data segments based on a predetermined time interval.

The sample label determination unit 1213 may be configured to determine, for each of the plurality of sample data segments, a standard heading of a target vehicle corresponding to the sample data segment, and designate the standard heading as a label of the sample data segment, wherein the target user device is associated with the target vehicle.

The sample feature vector determination unit 1214 may be configured to determine, for each of the plurality of sample data segments, M statistical values with respect to sampled magnetic flux densities along each of the three axes, so as to obtain a 3*M-dimensional second feature vector for each of the plurality of sample data segments.

The classifier training unit 1215 may be configured to obtain a classifier for determining a heading of the target vehicle by performing, based on the labels and the plurality of second feature vectors corresponding to the plurality of sample data segments, a predetermined training routine of the classifier.

As can be seen from the above description, in the present disclosure, via a process including retrieving the second sensor data generated by the magnetometer of the target user device, determining the standard heading of the target vehicle corresponding to the sample data segment as the label of the sample data segment, determining a 3*M-dimensional feature vector (second feature vector) for each of the plurality of sample data segments, and obtaining the heading classifier by performing, based on the labels and the plurality of second feature vectors corresponding to the plurality of sample data segments, the predetermined training routine of the classifier, the determination of the heading of the target vehicle may be achieved based on the sensor data generated by the magnetometer of the target user device with enhanced accuracy. The time costs of the driver and the passenger for providing or receiving the transportation service may be saved, and the travel efficiency of the passenger may be improved.

Figure 13:
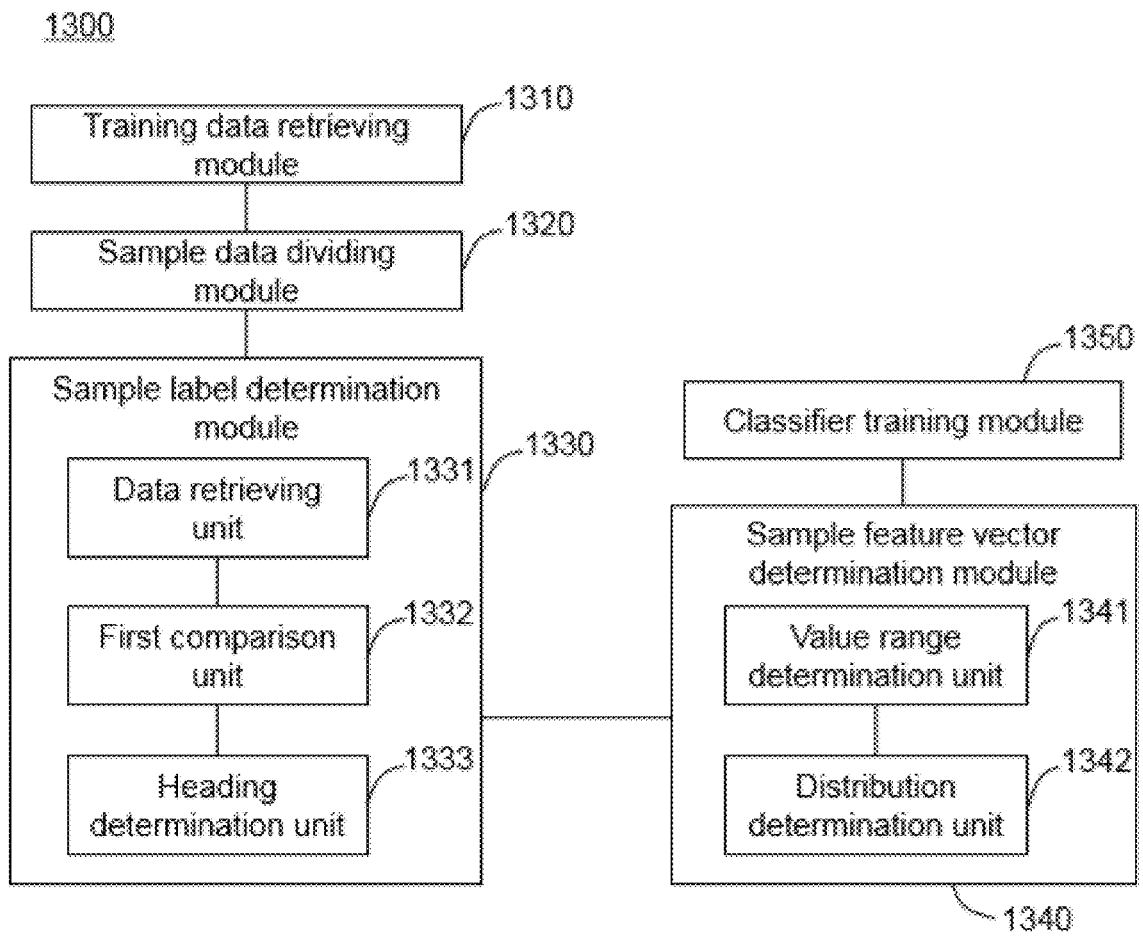
FIG. 13 is a schematic diagram illustrating an exemplary device for training a heading classifier according to some embodiments of the present disclosure.

FIG. 13 is a schematic diagram illustrating an exemplary device (device 1300) for training a heading classifier according to some embodiments of the present disclosure. The device 1300 may be implemented by one or more computing devices (e.g., the computing device 1000, the server 1420, the provider terminal 1440) to perform one or more corresponding operations of an aforementioned process (e.g., process 500, process 600). Training data retrieving module 1310, sample data dividing module 1320, sample label determination module 1330, sample feature vector determination module 1340, and classifier training module 1350 may be the same as or similar to the training data retrieving module 1211, the sample data dividing module 1212, the sample label determination module 1213, the sample feature vector determination module 1215, and the classifier training module 1215 as illustrated in FIG. 12, respectively, and the descriptions of which are not repeated herein. As shown in FIG. 13, the sample feature vector determination module 1340 may be further configured to determine, for each of the plurality of sample data segments, a mean, a variance, and a set of distribution statistics with respect to N predetermined value ranges for the corresponding sampled magnetic flux densities along each of the x, y, and z axes, respectively, wherein N+2=M.

In some embodiments, the sample feature vector determination module 340 may include a value range determination unit 1341 and a distribution determination unit 1342.

The value range determination unit 1341 may be configured to determine, based on the total value ranges of the sampled magnetic flux densities along the three axes, N predetermined value ranges.

The distribution determination unit 342 may be configured to obtain a set of distribution statistics by determining, for each of the three axes, a distribution of the sampled magnetic flux densities among the predetermined value ranges.

In some embodiments, the sample label determination module 1330 may include a data retrieving unit 1331, a first comparison unit 1332, and a heading determination unit 1333.

The data retrieving unit 1331 may be configured to retrieve GPS data of the target vehicle corresponding to each of the plurality of sample data segments, wherein the GPS data may include one or more bearings, longitudes, and latitudes.

The first comparison unit 1332 may be configured to determine, for the each of the plurality of sample data segment, based on the one or more latitudes and longitudes included in the GPS data, whether a corresponding displacement value of the target vehicle is above a predetermined second threshold, wherein the displacement value may be a displacement value of the target vehicle over a predetermined time interval corresponding to the sample data segment.

The heading determination unit 1333 may be configured to designate, upon determining that the displacement value is above the second threshold, a heading of the target vehicle at the end time point of a time slot corresponding to the each sample data segment as the heading corresponding to the each sample data segment.

In some embodiments, the heading determination unit 1333 may be further configured to round the bearing of the GPS data at the end time point of each sample data segment to a nearest standard value of a heading value set, wherein the heading value set may be predetermined as a result of a dividing of the value range of the heading.

FIG. 14 is a schematic diagram illustrating an exemplary online-to-offline service system according to some embodiments of the present disclosure. For example, an online-to-offline service system 1400 may be an online-to-offline transportation service system for transportation services such as taxi hailing, chauffeur services, delivery service, carpool, bus service, take-out service, driver hiring and shuttle services. For brevity, the methods and/or systems described in the present disclosure may take a taxi service as an example. It should be noted that the taxi service is merely provided for the purposes of illustration, and not intended to limit the scope of the present disclosure. For persons having ordinary skills in the art, the methods and/or systems described in the present disclosure may be applied to other similar situations, such as a take-out service, a delivery service, etc.

The online-to-offline service system 1400 may include a server 1410, a network 1420, a requester terminal 1430, a provider terminal 1440, a storage device 1450, and a positioning system 1460.

In some embodiments, the server 1410 may be a single server or a server group. The server group may be centralized, or distributed (e.g., the server 1410 may be a distributed system). In some embodiments, the server 1410 may be local or remote. For example, the server 1410 may access information and/or data stored in the requester terminal 1430, the provider terminal 1440, and/or the storage device 1450 via the network 1420. As another example, the server 1410 may be directly connected to the requester terminal 1430, the provider terminal 1440, and/or the storage device 1450 to access stored information and/or data. In some embodiments, the server 1410 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 1410 may be implemented on a computing device 200 having one or more components illustrated in FIG. 2 in the present disclosure.

In some embodiments, the server 1410 may include a processing engine 1412. The processing engine 1412 may process information and/or data relating to the online-to-offline service. For example, the processing engine 1412 may generate identification information of a service provider. In some embodiments, the server 1410 may have a structure the same as or similar to that of the computing device 1000 as illustrated in FIG. 10. For example, the processing engine 1412 may include one or more processors (e.g., processor 1010 illustrated in FIG. 10).

In some embodiments, the one or more processor included in the processing engine 1412 may implement a heading determination device described above (e.g., the device 1100, 1200, 1300) and perform a corresponding process (e.g., processes 100, 200, 500, 600, 700, 900)

The network 1420 may facilitate the exchange of information and/or data. In some embodiments, one or more components in the online-to-offline service system 1440 (e.g., the server 1410, the requester terminal 1430, the provider terminal 1440, the storage device 1450, and the positioning system 1460) may send information and/or data to other component(s) in the online-to-offline service system 1440 via the network 1420. For example, the server 1410 may obtain/acquire a service request from the requester terminal 1430 via the network 1420. In some embodiments, the network 1420 may be any type of wired or wireless network, or a combination thereof. Merely by way of example, the network 1430 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 1420 may include one or more network access points. For example, the network 1420 may include wired or wireless network access points such as base stations and/or internet exchange points 1420-1, 1420-2, . . . , through which one or more components of the online-to-offline service system 1400 may be connected to the network 1420 to exchange data and/or information.

In some embodiments, a requester may be a user of the requester terminal 1430. In some embodiments, the user of the requester terminal 1430 may be someone other than the requester. For example, a user A of the requester terminal 1430 may use the requester terminal 1430 to send a service request for a user B, or receive service and/or information or instructions from the server 1410. In some embodiments, a provider may be a user of the provider terminal 1440. In some embodiments, the user of the provider terminal 1440 may be someone other than the provider. For example, a user C of the provider terminal 1440 may user the provider terminal 1440 to receive a service request for a user D, and/or information or instructions from the server 1410.

In some embodiments, the requester terminal 1430 may include a mobile device 1430-1, a tablet computer 1430-2, a laptop computer 1430-3, a built-in device in a motor vehicle 1430-4, or the like, or any combination thereof. In some embodiments, the mobile device 1430-1 may include a smart home device, a wearable device, a mobile device, a virtual reality device, an augmented reality device, or the like, or any combination thereof. In some embodiments, the smart home device may include a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 1430-4 may include an onboard computer, an onboard television, etc. In some embodiments, the requester terminal 1430 may be a device with positioning technology for locating the position of a user of the requester terminal 1430 (e.g., a service requester) and/or the requester terminal 1430.

In some embodiments, the provider terminal 1440 may be a device that is similar to, or the same as the requester terminal 1430. For example, the provider terminal 1440 may also be or include a mobile device 1440-1, a tablet computer 1440-2, a laptop computer 1440-3, a built-in device in a motor vehicle 1440-4, which are the same as or similar to the mobile device 1430-1, the tablet computer 1430-2, the laptop computer 1430-3, the built-in device in a motor vehicle 1430-4. In some embodiments, the provider terminal 1440 may be a device utilizing positioning technology for locating the position of a user of the provider terminal 1440 (e.g., a service provider) and/or the provider terminal 1440. In some embodiments, the requester terminal 1430 and/or the provider terminal 1440 may communicate with one or more other positioning devices to determine the position of the requester, the requester terminal 1430, the provider, and/or the provider terminal 1440. In some embodiments, the requester terminal 1430 and/or the provider terminal 1440 may send positioning information to the server 1410.

The provider terminal 1440 may be an example of the target user device 310 and may be associated with a vehicle (e.g., the target vehicle 300 as illustrated in FIG. 300). The provider terminal may include a magnetometer for sensing magnetic flux densities and generate corresponding sensor data (e.g., first sensor data, second sensor data). In some embodiments, the provider terminal may include a positioning module (e.g., GPS receiver 320) for determine the location and/or displacement of the provider terminal 1440 or the associated vehicle. In some embodiments, the provider terminal 1440 may have a structure the same as or similar to that of the computing device 1000 as illustrated in FIG. 10. For example, the provider terminal 1440 may include one or more processors (e.g., the processor 1010 illustrated in FIG. 10).

In some embodiments, the one or more processor included in the provider terminal 1440 may implement a heading determination device described above (e.g., the device 1100, 1200, 1300) and perform a corresponding process (e.g., processes 100, 200, 500, 600, 700, 900).

In some embodiments, the provider terminal 1440 and the processing engine 1412 may together implement a heading determination device described above and may each perform one or more corresponding operations of an aforementioned heading determination process. Take the device 1200 as an example, the classifier training module 1210 may be implemented by the processing engine 1412, while the test data retrieving module 1260, the test data dividing module 1270, the test feature vector determination module 1280, the heading data retrieving module 1290, and the heading determination module 1220 may be implemented by the provider terminal 1440. Take the device 1300 as another example, the training data retrieving module 1310, the sample data dividing module 1320, the sample label determination module 1330, and the sample feature vector determination module 1340 may be implemented by the provider terminal 1440, while the classifier training module 1350 may be implemented by the processing engine 1412. The above examples are provided merely for demonstration purposes and not intended to be limiting.

In some embodiments, a heading determination device may be implemented at least by the server 1410 (or the processing engine 1412). The heading determination device may detect an application executing on the provider terminal 1440 (e.g., a mobile computing device such as the mobile phone 400). The application may automatically communicate with the network 1420. The heading determination device may determine, based on data determined by the application executing to interface with a positioning module (e.g., the GPS receiver 320) of the provider terminal 1440, a current location of the provider terminal 1440 or an associated vehicle (e.g., the target vehicle 300). The heading determination device may provide data to the application to generate a presentation on a display of the provider terminal 1440. The presentation may include a map. The heading determination device may communicate with the application to receive a request for determining the heading of the vehicle and then perform a heading determination process (e.g., process 100, 200, 700, 900). The heading determination device may provide data to the application to cause the presentation to depict the current location of the provider terminal 1440 and the determined heading of the vehicle. In some embodiments, the heading determination device may further determine a route for the vehicle based on the current location of the vehicle (e.g., determined by the current GPS data), the current heading, and a destination. The provider terminal 1440 may provide means (e.g., via the aforementioned presentation) for a driver to input the destination. Alternatively, the destination may be included in a service request send by a passenger.

In some embodiments, the training of the heading classifier may be performed by the server 1410 (or the processing engine 1412) and the provider terminal 1440 may retrieve the trained classifier from the server 1410 (or the storage device 1450 if the server 1410 transmits the trained classifier to the storage device 1450 for storage). The trained classifier may associate with identity information (e.g., account, serial number, phone number, media access control (MAC) address, internet protocol (IP) address) of the provider terminal 1440 or a user (e.g., driver) of the provider terminal 1440. The provider terminal 1440 may retrieve the trained classifier from the server 1410 (or the storage device 1450) based on the identity information.

In some embodiments, the provider terminal 1440 may associate with multiple vehicles. The trained classifier may further associate with the identity information (e.g., brand, license plate, color, serial number) of the corresponding vehicle. The provider terminal 1440 may provide means (e.g., via the aforementioned presentation) for a user to select a vehicle or a classifier, and then retrieve the corresponding trained classifier. Alternatively or additionally, the provider terminal 1440 may capture (e.g., via a camera) an image (photo or video) of the interior and/or exterior of a vehicle. The processing engine 1412 and/or the provider terminal 1440 may then identify the identity of the vehicle based on the image. The provider terminal 1440 may retrieve the corresponding trained classifier from the server 1410 based on the result of identification.

In some embodiments, multiple provider terminals 1440 may associate with a same vehicle. The multiple provider terminals 1440 may share a same heading classifier, or retrieve a heading classifier of its own.

The storage device 1450 may store data and/or instructions. In some embodiments, the storage device 1450 may store data obtained from the requester terminal 1430 and/or the provider terminal 1440. In some embodiments, the storage device 1450 may store data and/or instructions that the server 1410 may execute or use to perform exemplary methods described in the present disclosure. In some embodiments, the storage device 1450 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 1450 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 1450 may be connected to the network 1420 to communicate with one or more components in the online-to-offline service system 1440 (e.g., the server 1410, the requester terminal 1430, the provider terminal 1440, etc.). One or more components in the online-to-offline service system 14400 may access the data or instructions stored in the storage device 1450 via the network 1420. In some embodiments, the storage device 1450 may be directly connected to or communicate with one or more components in the online-to-offline service system 1440 (e.g., the server 1410, the requester terminal 1430, the provider terminal 1440, etc.). In some embodiments, one or more components in the online-to-offline service system 1440 (e.g., the server 1410, the requester terminal 1430, the provider terminal 1440, etc.) may have permission to access the storage device 1450. In some embodiments, the storage device 1450 may be part of the server 1410.

The positioning system 1460 may determine information associated with an object, for example, the requester terminal 1430, the provider terminal 1440, etc. For example, the positioning system 1460 may determine a current location of the requester terminal 1430. In some embodiments, the positioning system 1460 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The location may be in the form of coordinates, such as, latitude coordinate and longitude coordinate, etc. The positioning system 1460 may include one or more satellites, for example, a satellite 1460-1, a satellite 1460-2, and a satellite 1460-3. The satellites 1460-1 through 1460-3 may determine the information mentioned above independently or jointly. The satellite positioning system 1460 may send the information mentioned above to the network 1420, the requester terminal 1430, or the provider terminal 1440 via wireless connections.

In some embodiments, information exchanging of one or more components in the online-to-offline service system 1440 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal (e.g., a mobile application), a program, a system, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a vessel, an aircraft (e.g., an airplane, a helicopter, an unmanned aerial vehicle (UAV)), or the like, or any combination thereof.

It may be noted that, the online-to-offline service system 1400 is only provided for demonstration, and not intended to be limiting. The heading determination method and the corresponding system described in the present disclosure may have other application scenarios. For example, the heading determination method may also be applied for determining a heading of a private car (or another type of vehicle).

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment"

or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for determining a heading of a vehicle, the system comprising:
   at least one network interface to communicate, via a network system, with a mobile computing device associated with the vehicle;
   at least one processor coupled to the at least one network interface, the at least one processor is configured to:
      receive, from the mobile computing device, a request for determining the heading of the vehicle;
      retrieve, at least in response to the request, sensor data generated by a magnetometer of the mobile computing device within one or more first time slots;
      obtain a classifier trained to determine a predicted heading of the vehicle;
      for the sensor data of each of the one or more first time slots:
         obtain a feature vector by extracting features from the sensor data;
         determine, based on the obtained feature vector, a predicted heading by inputting the feature vector into the classifier;
      and
      determine the heading of the vehicle based on one or more predicted headings corresponding to the one or more first time slots.

2. The system of claim 1, wherein:
   the sensor data of each of the one or more first slots is associated with a weight; and
   to determine the heading of the vehicle based on the one or more predicted headings, the at least one processor is configured to:
      determine, for each unique heading of the one or more predicted headings, a sum of weights of each unique heading; and
      determine the heading of the vehicle based on a ranking of one or more sums of weights corresponding to one or more unique headings of the one or more predicted headings.

3. The system of claim 1, wherein to retrieve the sensor data generated by the magnetometer, the at least one processor is configured to:
   retrieve, in response to the request, first positioning data determined by the mobile computing device within a second time slot;
   determine a first displacement value of the vehicle over the second time slot based on the first positioning data;
   determine whether the first displacement value is less than a first threshold;
   upon determining that the first displacement value is less than the first threshold, retrieve the sensor data for determining the heading of the vehicle; and
   upon determining that the first displacement value is more than or equal to the first threshold, determine the heading of the vehicle based on the first positioning data.

4. The system of claim 1, wherein to obtain the feature vector by extracting the features from the sensor data, the at least one processor is configured to:
   determine, based on the sensor data, a plurality of magnetic flux densities along three axes of a Cartesian coordinate system with respect to the mobile computing device;
   for each of the three axes:
      determine a mean and a variance of the magnetic flux densities along the axis; and
      generate a histogram measuring a distribution of values of the magnetic flux densities along the axis; and
   generate the feature vector based on the means, the variances, and the histograms of the three axes.

5. The system of claim 1, wherein the at least one processor is further configured to train the classifier, and to train the classifier, the at least one processor is configured to:
   generate a training dataset, wherein to generate the training dataset, the at least one processor is configured to:
      retrieve sensor data generated by the magnetometer of the mobile computing device within a plurality of third time slots; and
      for each of the plurality of third time slots:
         obtain a feature vector by extracting features from the sensor data of the third time slot;
         determine a standard heading of the vehicle corresponding to the third time slot; and
         designate the standard heading of the vehicle corresponding to the third time slot as a supervisory output of the feature vector;
      and
      generate the training dataset using the feature vectors and the corresponding supervisory outputs of the plurality of third time slots;
   and
   train the classifier using a training routine and the training dataset.

6. The system of claim 5, wherein the training routine is based on a random forest algorithm.

7. The system of claim 5, wherein the at least one processor is configured further to update the classifier, and to update the classifier, the at least one processor is configured to:
   select a first plurality of decision trees from the classifier;
   obtain an updated training dataset by updating the training dataset;
   train a second plurality of decision trees using the updated training dataset; and
   generate an updated classifier with the first plurality of decision trees and the second plurality of decision trees.

8. The system of claim 5, wherein to determine the standard heading of the vehicle corresponding to the third time slot, the at least one processor is configured to:
   retrieve, in response to the request, second positioning data determined by a positioning module of the mobile computing device within the third time slot;
   determine a second displacement value of the vehicle over the third time slot based on the second positioning data;
   determine whether the second displacement value is more than a second threshold; and
   upon determining that the second displacement value is more than the second threshold, determine the standard heading of the vehicle corresponding to the third time slot based on the second positioning data.

9. The system of claim 8, wherein to determine the standard heading of the vehicle corresponding to the third time slot based on the second positioning data, the at least one processor is configured to:
   determine a preliminary standard heading based on the second positioning data;
   determine a plurality of heading classes;
   classify the preliminary standard heading into one of the plurality of heading classes; and
   designate a heading corresponding to the heading class of the preliminary standard heading as the standard heading of the vehicle corresponding to the third time slot.

10. The system of claim 8, wherein to determine the standard heading of the vehicle corresponding to the third time slot, the at least one processor is further configured to:
upon determining that the second displacement value is less than or equal to the second threshold, exclude the sensor data of the corresponding third time slot from being used to generate the training dataset.

11. The system of claim 1, wherein the at least one processor is further configured to:
detect an application executing on the mobile computing device, the application automatically communicating with the network system;
determine, based on data determined by the application executing to interface with a positioning module of the mobile computing device, a current location of the mobile computing device;
provide data to the application to generate a presentation on a display of the mobile computing device, the presentation including a map;
communicate with the application to receive the request;
provide data to the application to cause the presentation to depict (i) the current location of the mobile computing device and (ii) the heading of the vehicle.

12. A method for determining a heading of a vehicle, comprising:
receiving, by a heading determination device, a request for determining the heading of the vehicle from a mobile computing device;
retrieving, by the heading determination device, at least in response to the request, sensor data generated by a magnetometer of the mobile computing device within one or more first time slots;
obtaining, by the heading determination device, a classifier trained to determine a predicted heading of the vehicle;
for the sensor data of each of the one or more first time slots:
obtaining, by the heading determination device, a feature vector by extracting features from the sensor data; and
determining, by the heading determination device based on the obtained feature vector, a predicted heading by inputting the feature vector into the classifier;
and
determining, by the heading determination device, the heading of the vehicle based on one or more predicted headings corresponding to the one or more first time slots.

13. The method of claim 12, wherein:
the sensor data of each of the one or more first slots is associated with a weight; and
the determining the heading of the vehicle based on the obtained one or more predicted headings includes:
determining, for each unique heading of the one or more predicted headings, a sum of weights of the each unique heading; and
determining the heading of the vehicle based on a ranking of one or more sums of weights corresponding to one or more unique headings of the one or more predicted headings.

14. The method of claim 12, wherein the retrieving the sensor data generated by the magnetometer comprises:
retrieving, in response to the request, first positioning data determined by the mobile computing device within a second time slot;
determining a first displacement value of the vehicle over the second time slot based on the first positioning data;
determining whether the first displacement value is less than a first threshold;
upon determining that the first displacement value is less than the first threshold, retrieving the sensor data for determining the heading of the vehicle;
and
upon determining that the first displacement value is more than or equal to the first threshold, determining the heading of the vehicle based on the first positioning data.

15. The method of claim 12, wherein the obtaining the feature vector by extracting the features from the sensor data comprises:
determining, based on the sensor data, a plurality of magnetic flux densities along three axes of a Cartesian coordinate system with respect to the mobile computing device;
for each of the three axes:
determining a mean and a variance of the magnetic flux densities along the axis; and
generating a histogram measuring a distribution of values of the magnetic flux densities along the axis;
and
generating the feature vector based on the means, the variances, and the histograms of the three axes.

16. The method of claim 12, further comprising training the classifier, wherein the training the classifier comprises:
generating a training dataset, including:
retrieving sensor data generated by the magnetometer of the mobile computing device within a plurality of third time slots; and
for each of the plurality of third time slots:
obtaining a feature vector by extracting features from the sensor data of the third time slot;
determining a standard heading of the vehicle corresponding to the third time slot; and
designating the standard heading of the vehicle corresponding to the third time slot as a supervisory output of the feature vector;
and
generating the training dataset using the feature vectors and the corresponding supervisory outputs of the plurality of third time slots;
and
training the classifier using a training routine and the training dataset.

17. The method of claim 16, wherein the training routine is based on a random forest algorithm.

18. The method of claim 16, further comprising updating the classifier, wherein the updating the classifier comprises:
selecting a first plurality of decision trees from the classifier;
obtaining an updated training dataset by updating the training dataset;
training a second plurality of decision trees using the updated training dataset; and
generating an updated classifier with the first plurality of decision trees and the second plurality of decision trees.

19. The method of claim 16, wherein the determining the standard heading of the vehicle corresponding to the third time slot comprises:
retrieving, in response to the request, second positioning data determined by a positioning module of the mobile computing device within the third time slot;

determining a second displacement value of the vehicle over the third time slot based on the second positioning data;

determining whether the second displacement value is more than a second threshold; and upon determining that the second displacement value is more than the second threshold, determining the standard heading of the vehicle corresponding to the third time slot based on the second positioning data.

20. A non-transitory computer readable medium, storing instructions, the instructions, when executed by a processor, causing the processor to execute operations comprising:

receiving a request for determining a heading of the vehicle from a mobile computing device;

retrieving, at least in response to the request, sensor data generated by a magnetometer of the mobile computing device within one or more first time slots;

obtaining a classifier trained to determine a predicted heading of the vehicle;

for the sensor data of each of the one or more first time slots:

obtaining a feature vector by extracting features from the sensor data;

and determining, based on the obtained feature vector, a predicted heading by inputting the feature vector into the classifier;

and determining the heading of the vehicle based on one or more predicted headings corresponding to the one or more first time slots.

* * * * *